US010997095B2

(12) United States Patent
Mayer et al.

(10) Patent No.: US 10,997,095 B2
(45) Date of Patent: May 4, 2021

(54) TRAINING PROCEDURE FOR RECEIVERS ASSOCIATED WITH A MEMORY DEVICE

(71) Applicant: Micron Technology, Inc., Boise, ID (US)

(72) Inventors: Peter Mayer, Neubiberg (DE); Thomas Hein, Munich (DE); Martin Brox, Munich (DE); Wolfgang Anton Spirkl, Germering (DE); Michael Dieter Richter, Ottobrunn (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/538,329

(22) Filed: Aug. 12, 2019

(65) Prior Publication Data

US 2020/0065267 A1 Feb. 27, 2020

Related U.S. Application Data

(60) Provisional application No. 62/720,817, filed on Aug. 21, 2018.

(51) Int. Cl.
*G06F 11/10* (2006.01)
*H03M 13/00* (2006.01)
*G06F 13/16* (2006.01)

(52) U.S. Cl.
CPC ...... *G06F 13/1668* (2013.01); *G06F 11/1004* (2013.01)

(58) Field of Classification Search
CPC .................. G06F 13/1668; G06F 11/1004
See application file for complete search history.

(56) References Cited

U.S. PATENT DOCUMENTS

| 9,942,028 | B1 | 4/2018 | Dickson et al. |
| 2002/0196510 | A1 | 12/2002 | Hietala et al. |
| 2005/0069031 | A1 | 3/2005 | Sunter et al. |
| 2005/0132158 | A1 | 6/2005 | Hampel et al. |
| 2010/0244799 | A1 | 9/2010 | Moussaoui |

(Continued)

OTHER PUBLICATIONS

ISA/KR, International Search Report and Written Opinion of the International Searching Authority, Int'l. Appl. No. PCT/US2019/046398, dated Dec. 2, 2019, Korean Intellectual Property Office, Seo-gu, Daejeon, Republic of Korea, 15 pgs.

*Primary Examiner* — Samir W Rizk
(74) *Attorney, Agent, or Firm* — Holland & Hart LLP

(57) ABSTRACT

Systems, apparatuses, and methods for training procedures on reference voltages and sampling times associated with symbols communicated with a memory device are described. The training procedures may be configured to compensate for variations that may occur in different symbols of a signal. For example, an individual training operation may be performed for each reference voltage within a first unit interval. These individual training operations may allow a reference voltage of the first unit interval to be positionable independent of other reference voltages in the same unit interval or in different unit intervals. In another example, an individual training operation may be performed for the sampling time associated with a reference voltage. These individual training operations may allow a sampling time associated with a reference voltage in the first unit interval to be positionable independent of other sampling times in the same unit interval or in different unit intervals.

25 Claims, 12 Drawing Sheets

(56) References Cited

U.S. PATENT DOCUMENTS

2013/0195155 A1* 8/2013 Pan .................. H04L 25/066
  375/219
2013/0243111 A1* 9/2013 Lee .................. H04L 25/022
  375/285

* cited by examiner

US 10,997,095 B2

TRAINING PROCEDURE FOR RECEIVERS ASSOCIATED WITH A MEMORY DEVICE

CROSS REFERENCE

The present Application for Patent claims priority to U.S. Provisional Patent Application No. 62/720,817 by Mayer et al., entitled "TRAINING PROCEDURE FOR RECEIVERS ASSOCIATED WITH A MEMORY DEVICE," filed Aug. 21, 2018, which is assigned to the assignee hereof and is expressly incorporated by reference in its entirety.

BACKGROUND

The following relates generally to a system that includes at least one memory device and more specifically, to a training procedure for receivers associated with a memory device.

Memory devices are widely used to store information in various electronic devices such as computers, wireless communication devices, cameras, digital displays, and the like. Information is stored by programing different states of a memory device. For example, binary devices may store one of two states, often denoted by a logic 1 or a logic 0. In other devices, more than two states may be stored. To access the stored information, a component of the device may read, or sense, at least one stored state in the memory device. To store information, a component of the device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, may maintain their stored logic state for extended periods of time even in the absence of an external power source. Volatile memory devices, e.g., DRAM, may lose their stored state over time unless they are periodically refreshed by an external power source.

Memory devices may include various channels for communicating information with other devices (e.g., a controller) within a system. Training procedures may be used to configure receivers to ensure that data is communicated effectively and efficiently between the memory devices and other components.

DETAILED DESCRIPTION

For some memory systems, training procedures may be used to tune receivers that communicate data between a host device and a memory device. Tuning the receivers may reduce the errors that may occur during transmission. Examples of parameters of a receiver that may be tuned may include reference voltages and sampling times. Due to different slew rates, cross talk, duty cycles, and/or burst position mismatches, the signals received across different unit intervals and/or different symbols or levels may vary. Individual training operations to tune the receiver may be used to address these differences.

Techniques for performing training procedures (e.g., on reference voltages and/or sampling times associated with individual symbols communicated across a conductive line) are described herein. The training procedures may include a baseline training operation, one or more individual training operations, or both. The training procedures may be configured to compensate for variations in the signal that may occur at different symbols, different unit intervals, or both. For example, an individual training operation may be performed for each reference voltage within a first unit interval. These individual training operations may allow a low-level reference voltage of the first unit interval to be positionable independent of the low-level reference voltage of a second unit interval, independent of a high-level reference voltage of the first unit interval, or both.

In another example, an individual training operation may be performed for the sampling time associated with a reference voltage. These individual training operations may allow a sampling time associated with low-level reference voltage in the first unit interval to be positionable independent of a sampling time associated with the high-level reference voltage in the first unit interval, the high-level reference voltage in the first unit interval, or both. In addition, these individual training operations may allow sampling times in the first unit interval to be positionable independent of one or more sampling times in other unit intervals.

Features of the disclosure are described below in the context of a memory system in FIGS. 1 and 2. Features of the disclosure are described in the context eye diagrams, flow charts, and circuit diagrams in FIGS. 3 through 7. These and other features of the disclosure are further illustrated by and described with reference to FIGS. 8 through 12, which include an apparatus diagram and flowcharts that relate to a training procedure for receivers associated with a memory device.

Figure 1:
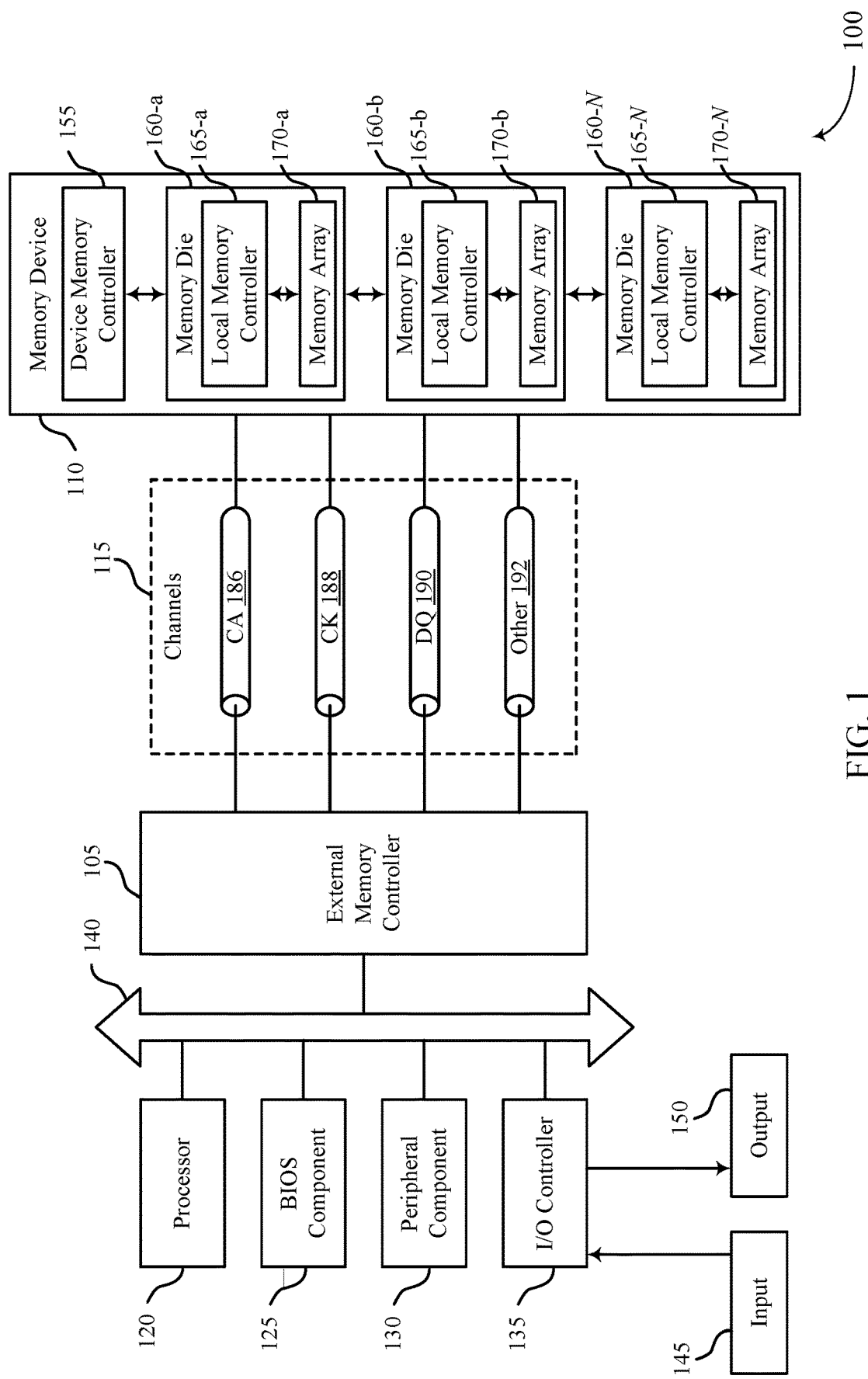
FIG. 1 illustrates an example of a system that supports a training procedure for receivers associated with a memory device in accordance with aspects of the present disclosure.

FIG. 1 illustrates an example of a system 100 that utilizes one or more memory devices in accordance with aspects disclosed herein. The system 100 may include an external memory controller 105, a memory device 110, and a plurality of channels 115 coupling the external memory controller 105 with the memory device 110. The system 100 may include one or more memory devices, but for ease of description the one or more memory devices may be described as a single memory device 110.

The system 100 may include aspects of an electronic device, such as a computing device, a mobile computing device, a wireless device, or a graphics processing device. The system 100 may be an example of a portable electronic device. The system 100 may be an example of a computer, a laptop computer, a tablet computer, a smartphone, a cellular phone, a wearable device, an internet-connected device, or the like. The memory device 110 may be component of the system configured to store data for one or more other components of the system 100. In some examples, the system 100 is configured for bi-directional wireless communication with other systems or devices using a base station or access point. In some examples, the system 100 is capable of machine-type communication (MTC), machine-to-machine (M2M) communication, or device-to-device (D2D) communication.

At least portions of the system 100 may be examples of a host device. Such a host device may be an example of a device that uses memory to execute processes such as a computing device, a mobile computing device, a wireless device, a graphics processing device, a computer, a laptop computer, a tablet computer, a smartphone, a cellular phone, a wearable device, an internet-connected device, some other stationary or portable electronic device, or the like. In some cases, the host device may refer to the hardware, firmware, software, or a combination thereof that implements the functions of the external memory controller 105. In some cases, the external memory controller 105 may be referred to as a host or host device. In some examples, system 100 is a graphics card. The host device may include a plurality of drivers and a plurality of drivers coupled channels linking the host device with the memory device. Training procedures may be used to tune one or more receivers to ensure that information is communicated effectively and efficiently between components.

In some cases, a memory device 110 may be an independent device or component that is configured to be in communication with other components of the system 100 and provide physical memory addresses/space to potentially be used or referenced by the system 100. In some examples, a memory device 110 may be configurable to work with at least one or a plurality of different types of systems 100. Signaling between the components of the system 100 and the memory device 110 may be operable to support modulation schemes to modulate the signals, different pin designs for communicating the signals, distinct packaging of the system 100 and the memory device 110, clock signaling and synchronization between the system 100 and the memory device 110, timing conventions, and/or other factors.

The memory device 110 may be configured to store data for the components of the system 100. In some cases, the memory device 110 may act as a slave-type device to the system 100 (e.g., responding to and executing commands provided by the system 100 through the external memory controller 105). Such commands may include an access command for an access operation, such as a write command for a write operation, a read command for a read operation, a refresh command for a refresh operation, or other commands. The memory device 110 may include two or more memory dice 160 (e.g., memory chips) to support a desired or specified capacity for data storage. The memory device 110 including two or more memory dice may be referred to as a multi-die memory or package (also referred to as multi-chip memory or package).

The system 100 may further include a processor 120, a basic input/output system (BIOS) component 125, one or more peripheral components 130, and an input/output (I/O) controller 135. The components of system 100 may be coupled with or in electronic communication with one another using a bus 140.

The processor 120 may be configured to control at least portions of the system 100. The processor 120 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components. In such cases, the processor 120 may be an example of a central processing unit (CPU), a graphics processing unit (GPU), a general purpose GPU (GPGPU), or a system on a chip (SoC), among other examples.

The BIOS component 125 may be a software component that includes a BIOS operated as firmware, which may initialize and run various hardware components of the system 100. The BIOS component 125 may also manage data flow between the processor 120 and the various components of the system 100, e.g., the peripheral components 130, the I/O controller 135, etc. The BIOS component 125 may include a program or software stored in read-only memory (ROM), flash memory, or any other non-volatile memory.

The peripheral component(s) 130 may be any input device or output device, or an interface for such devices, that may be integrated into or with the system 100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots. The peripheral component(s) 130 may be other components as would be understood by persons of ordinary skill in the art as peripherals.

The I/O controller 135 may manage data communication between the processor 120 and the peripheral component(s) 130, input devices 145, or output devices 150. The I/O controller 135 may manage peripherals that are not integrated into or with the system 100. In some cases, the I/O controller 135 may represent a physical connection or port to external peripheral components.

The input 145 may represent a device or signal external to the system 100 that may provide information, signals, or data to the system 100 or its components. This may include a user interface or interface with or between other devices. In some cases, the input 145 may be a peripheral that interfaces with system 100 via one or more peripheral components 130 or may be managed by the I/O controller 135.

The output 150 may represent a device or signal external to the system 100 configured to receive an output from the system 100 or any of its components. Examples of the output 150 may include a display, audio speakers, a printing device, or another processor on printed circuit board, and so forth. In some cases, the output 150 may be a peripheral that interfaces with the system 100 via one or more peripheral components 130 or may be managed by the I/O controller 135.

The components of system 100 may be made up of general-purpose or special purpose circuitry designed to carry out their functions. This may include various circuit elements, for example, conductive lines, transistors, capacitors, inductors, resistors, amplifiers, or other active or passive elements, configured to carry out the functions described herein.

The memory device 110 may include a device memory controller 155 and one or more memory dice 160. Each memory die 160 may include a local memory controller 165 (e.g., local memory controller 165-a, local memory controller 165-b, and/or local memory controller 165-N) and a memory array 170 (e.g., memory array 170-a, memory array 170-b, and/or memory array 170-N). A memory array 170 may be a collection (e.g., a grid) of memory cells, with each memory cell being configured to store at least one bit of digital data. Features of memory arrays 170 and/or memory cells are described in more detail with reference to FIG. 2.

The memory device 110 may be an example of a two-dimensional (2D) array of memory cells or may be an example of a three-dimensional (3D) array of memory cells. For example, a 2D memory device may include a single memory die 160. A 3D memory device may include two or more memory dice 160 (e.g., memory die 160-a, memory die 160-b, and/or any quantity of memory dice 160-N). In a 3D memory device, a plurality of memory dice 160-N may be stacked on top of one another. In some cases, memory dice 160-N in a 3D memory device may be referred to as decks, levels, layers, or dies. A 3D memory device may include any quantity of stacked memory dice 160-N (e.g., two high, three high, four high, five high, six high, seven high, eight high). This may increase the quantity of memory cells that may be positioned on a substrate as compared with a single 2D memory device, which in turn may reduce production costs, or increase the performance of the memory array, or both. In some 3D memory device, different decks may share at least one common access line such that some decks may share at least one of a word line, a digit line, and/or a plate line.

The device memory controller 155 may include circuits or components configured to control operation of the memory device 110. As such, the device memory controller 155 may include the hardware, firmware, and software that enables the memory device 110 to perform commands and may be configured to receive, transmit, or execute commands, data, or control information related to the memory device 110. The device memory controller 155 may be configured to communicate with the external memory controller 105, the one or more memory dice 160, or the processor 120. In some cases, the memory device 110 may receive data and/or commands from the external memory controller 105. For example, the memory device 110 may receive a write command indicating that the memory device 110 is to store certain data on behalf of a component of the system 100 (e.g., the processor 120) or a read command indicating that the memory device 110 is to provide certain data stored in a memory die 160 to a component of the system 100 (e.g., the processor 120). In some cases, the device memory controller 155 may control operation of the memory device 110 described herein in conjunction with the local memory controller 165 of the memory die 160. Examples of the components included in the device memory controller 155 and/or the local memory controllers 165 may include receivers for demodulating signals received from the external memory controller 105, decoders for modulating and transmitting signals to the external memory controller 105, logic, decoders, amplifiers, filters, or the like. The device memory controller 155 and/or one or more local memory controllers 165 may be used to perform training procedures to tune the receivers coupled with channels 115. The controllers 155, 165 may implement training procedures that include baseline training operations and individual training operations as described herein.

The local memory controller 165 (e.g., local to a memory die 160) may be configured to control operations of the memory die 160. Also, the local memory controller 165 may be configured to communicate (e.g., receive and transmit data and/or commands) with the device memory controller 155. The local memory controller 165 may support the device memory controller 155 to control operation of the memory device 110 as described herein. In some cases, the memory device 110 does not include the device memory controller 155, and the local memory controller 165 or the external memory controller 105 may perform the various functions described herein. As such, the local memory controller 165 may be configured to communicate with the device memory controller 155, with other local memory controllers 165, or directly with the external memory controller 105 or the processor 120.

The external memory controller 105 may be configured to enable communication of information, data, and/or commands between components of the system 100 (e.g., the processor 120) and the memory device 110. The external memory controller 105 may act as a liaison between the components of the system 100 and the memory device 110 so that the components of the system 100 may not need to know the details of the memory device's operation. The components of the system 100 may present requests to the external memory controller 105 (e.g., read commands or write commands) that the external memory controller 105 satisfies. The external memory controller 105 may convert or translate communications exchanged between the components of the system 100 and the memory device 110. In some cases, the external memory controller 105 may include a system clock that generates a common (source) system clock signal. In some cases, the external memory controller 105 may include a common data clock that generates a common (source) data clock signal. The external memory controller 105 may, in some examples, be used to perform training procedures to tune the receivers coupled with channels 115. The external memory controller 105 may implement training procedures that include baseline training operations and individual training operations as described herein.

In some cases, the external memory controller 105 or other component of the system 100, or its functions described herein, may be implemented by the processor 120. For example, the external memory controller 105 may be hardware, firmware, or software, or some combination thereof implemented by the processor 120 or other component of the system 100. Although the external memory controller 105 is depicted as being external to the memory device 110, in some cases, the external memory controller 105, or its functions described herein, may be implemented by a memory device 110. For example, the external memory controller 105 may be hardware, firmware, or software, or some combination thereof implemented by the device memory controller 155 or one or more local memory controllers 165. In some cases, the external memory controller 105 may be distributed across the processor 120 and the memory device 110 such that portions of the external memory controller 105 are implemented by the processor 120 and other portions are implemented by a device memory controller 155 or a local memory controller 165. Likewise, in some cases, one or more functions ascribed herein to the device memory controller 155 or local memory controller 165 may in some cases be performed by the external memory controller 105 (either separate from or as included in the processor 120).

The components of the system 100 may exchange information with the memory device 110 using a plurality of channels 115. In some examples, the channels 115 may enable communications between the external memory controller 105 and the memory device 110. Each channel 115 may include one or more signal paths or transmission mediums (e.g., conductors) between terminals associated with the components of system 100. For example, a channel 115 may include a first terminal including one or more pins or pads at external memory controller 105 and one or more pins or pads at the memory device 110. A pin may be an example of a conductive input or output point of a device of the system 100, and a pin may be configured to act as part of a channel. In some cases, a pin or pad of a terminal may be part of to a signal path of the channel 115. Additional signal paths may be coupled with a terminal of a channel for routing signals within a component of the system 100. For example, the memory device 110 may include signal paths (e.g., signal paths internal to the memory device 110 or its components, such as internal to a memory die 160) that route a signal from a terminal of a channel 115 to the various components of the memory device 110 (e.g., a device memory controller 155, memory dice 160, local memory controllers 165, memory arrays 170). Drivers, receivers, or both may be used to communicate signals across the channels 115. In some cases, the reference voltages and/or sampling timings of the receivers may be tuned to improve the communication across conductive lines. Training procedures that include baseline training operations and individual training operations may be implemented to tune the receivers.

Channels 115 (and associated signal paths and terminals) may be dedicated to communicating specific types of information. In some cases, a channel 115 may be an aggregated channel and thus may include multiple individual channels. For example, a data channel 190 may be ×4 (e.g., including four signal paths), ×8 (e.g., including eight signal paths), ×16 (including sixteen signal paths), and so forth.

In some cases, the channels 115 may include one or more command and address (CA) channels 186. The CA channels 186 may be configured to communicate commands between the external memory controller 105 and the memory device 110 including control information associated with the commands (e.g., address information). For example, the CA channel 186 may include a read command with an address of the desired data. In some cases, the CA channels 186 may be registered on a rising clock signal edge and/or a falling clock signal edge. In some cases, a CA channel 186 may include eight or nine signal paths.

In some cases, the channels 115 may include one or more clock signal (CK) channels 188. The CK channels 188 may be configured to communicate one or more common clock signals between the external memory controller 105 and the memory device 110. Each clock signal may be configured to adjust (e.g., oscillate) between a high state and a low state and coordinate the actions of the external memory controller 105 and the memory device 110. In some cases, the clock signal may be a differential output (e.g., a CK_t signal and a CK_c signal) and the signal paths of the CK channels 188 may be configured accordingly. In some cases, the clock signal may be single ended. In some cases, the clock signal may be a 1.5 GHz signal. A CK channel 188 may include any quantity of signal paths. In some cases, the clock signal CK (e.g., a CK_t signal and a CK_c signal) may provide a timing reference for command and addressing operations for the memory device 110, or other system-wide operations for the memory device 110. The clock signal CK therefore may be variously referred to as a control clock signal CK, a command clock signal CK, or a system clock signal CK. The system clock signal CK may be generated by a system clock, which may include one or more hardware components (e.g., oscillators, crystals, logic gates, transistors, or the like).

In some cases, the channels 115 may include one or more data (e.g., DQ) channels 190. The data channels 190 may be configured to communicate data and/or control information between the external memory controller 105 and the memory device 110. For example, the data channels 190 may communicate information (e.g., bi-directional) to be written to the memory device 110 or information read from the memory device 110. The data channels 190 may communicate signals that may be modulated using a variety of different modulation schemes (e.g., NRZ, PAM4).

In some cases, the channels 115 may include one or more other channels 192 that may be dedicated to other purposes. These other channels 192 may include any quantity of signal paths.

In some cases, the other channels 192 may include one or more write clock signal (WCK) channels. Although the 'W' in WCK may nominally stand for "write," a write clock signal WCK (e.g., a WCK_t signal and a WCK_c signal) may provide a timing reference for access operations generally for the memory device 110 (e.g., a timing reference for both read and write operations). Accordingly, the write clock signal WCK may also be referred to as a data clock signal WCK. The WCK channels may be configured to communicate a common data clock signal between the external memory controller 105 and the memory device 110. The data clock signal may be configured to coordinate an access operation (e.g., a write operation or read operation) of the external memory controller 105 and the memory device 110. In some cases, the write clock signal may be a differential output (e.g., a WCK_t signal and a WCK_c signal) and the signal paths of the WCK channels may be configured accordingly. A WCK channel may include any quantity of signal paths. The data clock signal WCK may be generated by a data clock, which may include one or more hardware components (e.g., oscillators, crystals, logic gates, transistors, or the like).

In some cases, the other channels 192 may include one or more error detection code (EDC) channels. The EDC channels may be configured to communicate error detection signals, such as checksums, to improve system reliability. An EDC channel may include any quantity of signal paths.

The channels 115 may couple the external memory controller 105 with the memory device 110 using a variety of different architectures. Examples of the various architectures may include a bus, a point-to-point connection, a crossbar, a high-density interposer such as a silicon interposer, or channels formed in an organic substrate or some combination thereof. For example, in some cases, the signal paths may at least partially include a high-density interposer, such as a silicon interposer or a glass interposer.

Signals communicated over the channels 115 may be modulated using a variety of different modulation schemes. In some cases, a binary-symbol (or binary-level) modulation scheme may be used to modulate signals communicated between the external memory controller 105 and the memory device 110. A binary-symbol modulation scheme may be an example of a M-ary modulation scheme where M is equal to two. Each symbol of a binary-symbol modulation scheme may be configured to represent one bit of digital data (e.g., a symbol may represent a logic 1 or a logic 0). Examples of binary-symbol modulation schemes include, but are not limited to, non-return-to-zero (NRZ), unipolar encoding, bipolar encoding, Manchester encoding, pulse amplitude modulation (PAM) having two symbols (e.g., PAM2), and/or others.

In some cases, a multi-symbol (or multi-level) modulation scheme may be used to modulate signals communicated between the external memory controller 105 and the memory device 110. A multi-symbol modulation scheme may be an example of a M-ary modulation scheme where M is greater than or equal to three. Each symbol of a multi-symbol modulation scheme may be configured to represent more than one bit of digital data (e.g., a symbol may represent a logic 00, a logic 01, a logic 10, or a logic 11). Examples of multi-symbol modulation schemes include, but are not limited to, PAM4, PAM8, etc., quadrature amplitude modulation (QAM), quadrature phase shift keying (QPSK), and/or others. A multi-symbol signal (e.g., a PAM4 signal) may be a signal that is modulated using a modulation scheme that includes at least three levels to encode more than one bit of information. Multi-symbol modulation schemes and symbols may alternatively be referred to as non-binary, multi-bit, or higher-order modulation schemes and symbols.

Figure 2:
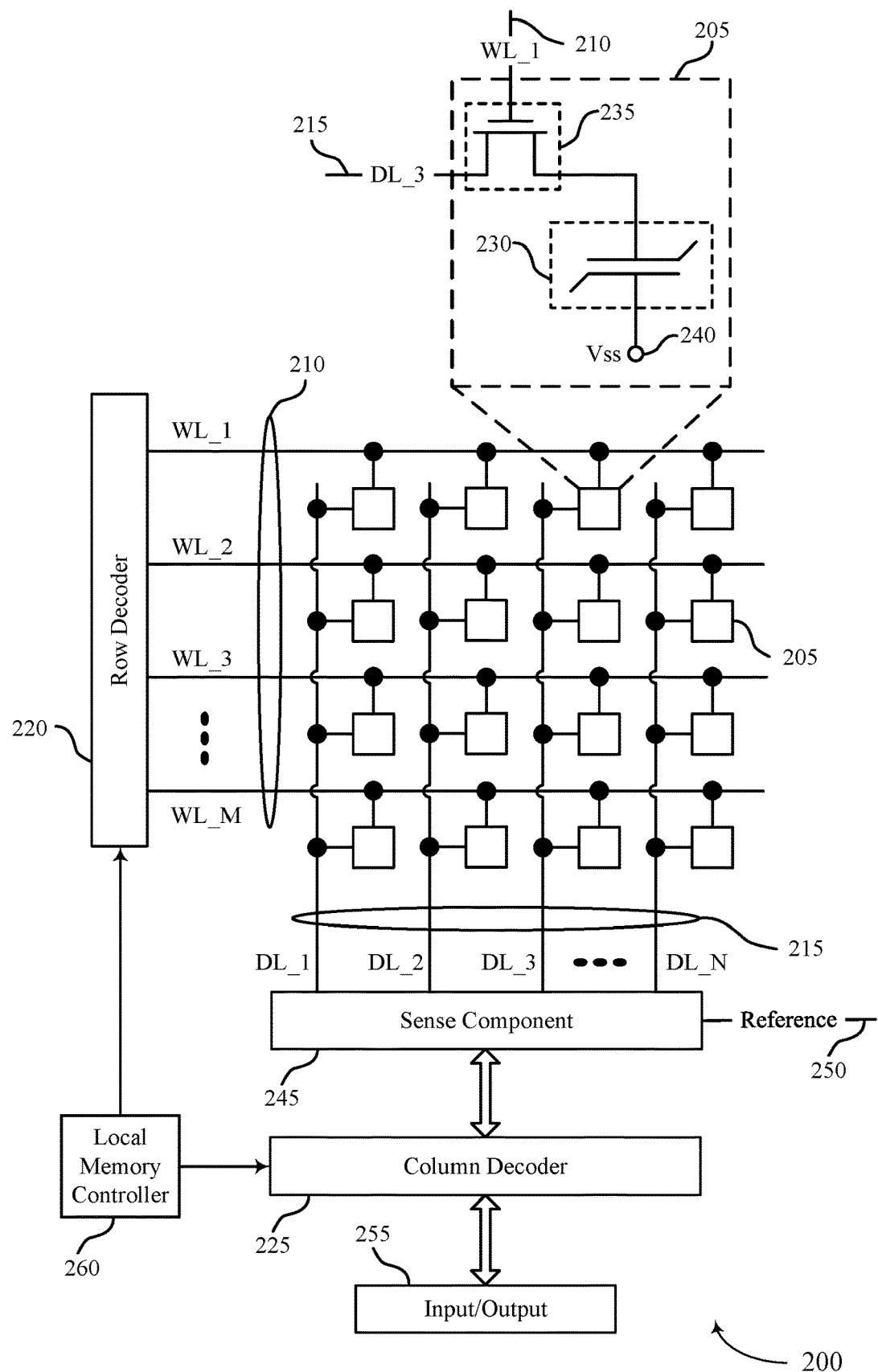
FIG. 2 illustrates an example of a memory die that supports a training procedure for receivers associated with a memory device in accordance with aspects of the present disclosure.

FIG. 2 illustrates an example of a memory die 200 in accordance with various examples of the present disclosure. The memory die 200 may be an example of the memory dice 160 described with reference to FIG. 1. In some cases, the memory die 200 may be referred to as a memory chip, a memory device, or an electronic memory apparatus. The memory die 200 may include one or more memory cells 205 that are programmable to store different logic states. Each memory cell 205 may be programmable to store two or more states. For example, the memory cell 205 may be configured to store one bit of digital logic at a time (e.g., a logic 0 and a logic 1). In some cases, a single memory cell 205 (e.g., a multi-level memory cell) may be configured to store more than one bit of digit logic at a time (e.g., a logic 00, logic 01, logic 10, or a logic 11).

A memory cell 205 may store a charge representative of the programmable states in a capacitor. In DRAM architectures, a memory cell 205 may include a capacitor that includes a dielectric material to store a charge representative of the programmable state. In other memory architectures, other storage devices and components are possible. For example, nonlinear dielectric materials may be employed.

Operations such as reading and writing may be performed on memory cells 205 by activating or selecting access lines such as a word line 210 and/or a digit line 215. In some cases, digit lines 215 may also be referred to as bit lines. References to access lines, word lines and digit lines, or their analogues, are interchangeable without loss of understanding or operation. Activating or selecting a word line 210 or a digit line 215 may include applying a voltage to the respective line.

The memory die 200 may include the access lines (e.g., the word lines 210 and the digit lines 215) arranged in a grid-like pattern. Memory cells 205 may be positioned at intersections of the word lines 210 and the digit lines 215. By biasing a word line 210 and a digit line 215 (e.g., applying a voltage to the word line 210 or the digit line 215), a single memory cell 205 may be accessed at their intersection.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address. For example, the memory die 200 may include multiple word lines 210, labeled WL_1 through WL_M, and multiple digit lines 215, labeled DL_1 through DL_N, where M and N depend on the size of the memory array. Thus, by activating a word line 210 and a digit line 215, e.g., WL_1 and DL_3, the memory cell 205 at their intersection may be accessed. The intersection of a word line 210 and a digit line 215, in either a two-dimensional or three-dimensional configuration, may be referred to as an address of a memory cell 205.

The memory cell 205 may include a logic storage component, such as capacitor 230 and a switching component 235. The capacitor 230 may be an example of a dielectric capacitor or a ferroelectric capacitor. A first node of the capacitor 230 may be coupled with the switching component 235 and a second node of the capacitor 230 may be coupled with a voltage source 240. In some cases, the voltage source 240 is a ground such as Vss. In some cases, the voltage source 240 may be an example of a plate line coupled with a plate line driver. The switching component 235 may be an example of a transistor or any other type of switch device that selectively establishes or de-establishes (e.g., ceases) electronic communication between two components.

Selecting or deselecting the memory cell 205 may be accomplished by activating or deactivating the switching component 235. The capacitor 230 may be in electronic communication with the digit line 215 using the switching component 235. For example, the capacitor 230 may be isolated from digit line 215 when the switching component 235 is deactivated, and the capacitor 230 may be coupled with digit line 215 when the switching component 235 is activated. In some cases, the switching component 235 may be or include a transistor and its operation may be controlled by applying a voltage to the transistor gate, where the voltage differential between the transistor gate and transistor source may be greater or less than a threshold voltage of the transistor. In some cases, the switching component 235 may be or include a p-type transistor or an n-type transistor. The word line 210 may be in electronic communication with the gate of the switching component 235 and may activate/deactivate the switching component 235 based on a voltage being applied to word line 210.

A word line 210 may be a conductive line in electronic communication with a memory cell 205 that may be used to perform access operations on the memory cell 205. In some architectures, the word line 210 may be in electronic communication with a gate of a switching component 235 of a memory cell 205 and may be configured to control the switching component 235 of the memory cell. In some architectures, the word line 210 may be in electronic communication with a node of the capacitor of the memory cell 205 and the memory cell 205 may not include a switching component.

A digit line 215 may be a conductive line that connects the memory cell 205 with a sense component 245. In some architectures, the memory cell 205 may be selectively coupled with the digit line 215 during portions of an access operation. For example, the word line 210 and the switching component 235 of the memory cell 205 may be configured to couple and/or isolate the capacitor 230 of the memory cell 205 and the digit line 215. In some architectures, the memory cell 205 may be in electronic communication (e.g., constant) with the digit line 215.

The sense component 245 may be configured to detect a state (e.g., a charge) stored on the capacitor 230 of the memory cell 205 and determine a logic state of the memory cell 205 based on the stored state. The charge stored by a memory cell 205 may be small, in some cases. As such, the sense component 245 may include one or more sense amplifiers to amplify the signal output by the memory cell 205. The sense amplifiers may detect small changes in the charge of a digit line 215 during a read operation and may produce signals corresponding to a logic state 0 or a logic state 1 based on the detected charge. During a read operation, the capacitor 230 of memory cell 205 may output a signal (e.g., discharge a charge) to its corresponding digit line 215. The signal may cause a voltage of the digit line 215 to change. The sense component 245 may be configured to compare the signal received from the memory cell 205 across the digit line 215 to a reference signal 250 (e.g., reference voltage). The sense component 245 may determine the stored state of the memory cell 205 based on the comparison. For example, in binary-signaling, if digit line 215 has a higher voltage than the reference signal 250, the sense component 245 may determine that the stored state of memory cell 205 is a logic 1 and, if the digit line 215 has a lower voltage than the reference signal 250, the sense component 245 may determine that the stored state of the memory cell 205 is a logic 0. The sense component 245 may include various transistors or amplifiers to detect and amplify a difference in the signals. The detected logic state of memory cell 205 may be output through column decoder 225 as output 255. In some cases, the sense component 245 may be part of another component (e.g., a column decoder 225, row decoder 220). In some cases, the sense component 245 may be in electronic communication with the row decoder 220 or the column decoder 225.

The local memory controller 260 may control the operation of memory cells 205 through the various components (e.g., row decoder 220, column decoder 225, and sense component 245). The local memory controller 260 may be an example of the local memory controller 165 described with reference to FIG. 1. In some cases, one or more of the row decoder 220, column decoder 225, and sense component 245 may be co-located with the local memory controller 260. The local memory controller 260 may be configured to receive commands and/or data from an external memory controller 105 (or a device memory controller 155 described with reference to FIG. 1), translate the commands and/or data into information that can be used by the memory die 200, perform one or more operations on the memory die 200, and communicate data from the memory die 200 to the external memory controller 105 (or the device memory controller 155) in response to performing the one or more operations. The local memory controller 260 may generate row and column address signals to activate the target word line 210 and the target digit line 215. The local memory controller 260 may also generate and control various voltages or currents used during the operation of the memory die 200. In general, the amplitude, shape, or duration of an applied voltage or current discussed herein may be adjusted or varied and may be different for the various operations discussed in operating the memory die 200. The local memory controller 260 may be used to perform training procedures to tune the receivers coupled with channels that run between multiple devices, such as a host device and a memory device. The local memory controller 260 may implement training procedures that include baseline training operations and individual training operations as described herein.

In some cases, the local memory controller 260 may be configured to perform a write operation (e.g., a programming operation) on one or more memory cells 205 of the memory die 200. During a write operation, a memory cell 205 of the memory die 200 may be programmed to store a desired logic state. In some cases, a plurality of memory cells 205 may be programmed during a single write operation. The local memory controller 260 may identify a target memory cell 205 on which to perform the write operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The local memory controller 260 may apply a first signal (e.g., voltage) to the digit line 215 during the write operation to store a first state (e.g., charge) in the capacitor 230 of the memory cell 205, and the first state (e.g., charge) may be indicative of a desired logic state. To receive a write command, the receiver of a memory device may be tuned using baseline training procedures and/or individual training procedures as described herein.

In some cases, the local memory controller 260 may be configured to perform a read operation (e.g., a sense operation) on one or more memory cells 205 of the memory die 200. During a read operation, the logic state stored in a memory cell 205 of the memory die 200 may be determined. In some cases, a plurality of memory cells 205 may be sensed during a single read operation. The local memory controller 260 may identify a target memory cell 205 on which to perform the read operation. The local memory controller 260 may identify a target word line 210 and a target digit line 215 in electronic communication with the target memory cell 205 (e.g., the address of the target memory cell 205). The local memory controller 260 may activate the target word line 210 and the target digit line 215 (e.g., applying a voltage to the word line 210 or digit line 215), to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference signal 250. Based on that comparison, the sense component 245 may determine a logic state that is stored on the memory cell 205. The local memory controller 260 may communicate the logic state stored on the memory cell 205 to the external memory controller 105 (or the device memory controller 155) as part of the read operation. To receive an output by a memory die 200, the receiver of a host device may be tuned using baseline training procedures and/or individual training procedures as described herein.

In some memory architectures, accessing the memory cell 205 may degrade or destroy the logic state stored in a memory cell 205. For example, a read operation performed in DRAM architectures may partially or completely discharge the capacitor of the target memory cell. The local memory controller 260 may perform a re-write operation or a refresh operation to return the memory cell to its original logic state. The local memory controller 260 may re-write the logic state to the target memory cell after a read operation. In some cases, the re-write operation may be considered part of the read operation. Additionally, activating a single access line, such as a word line 210, may disturb the state stored in some memory cells in electronic communication with that access line. Thus, a re-write operation or refresh operation may be performed on one or more memory cells that may not have been accessed.

Figure 3:
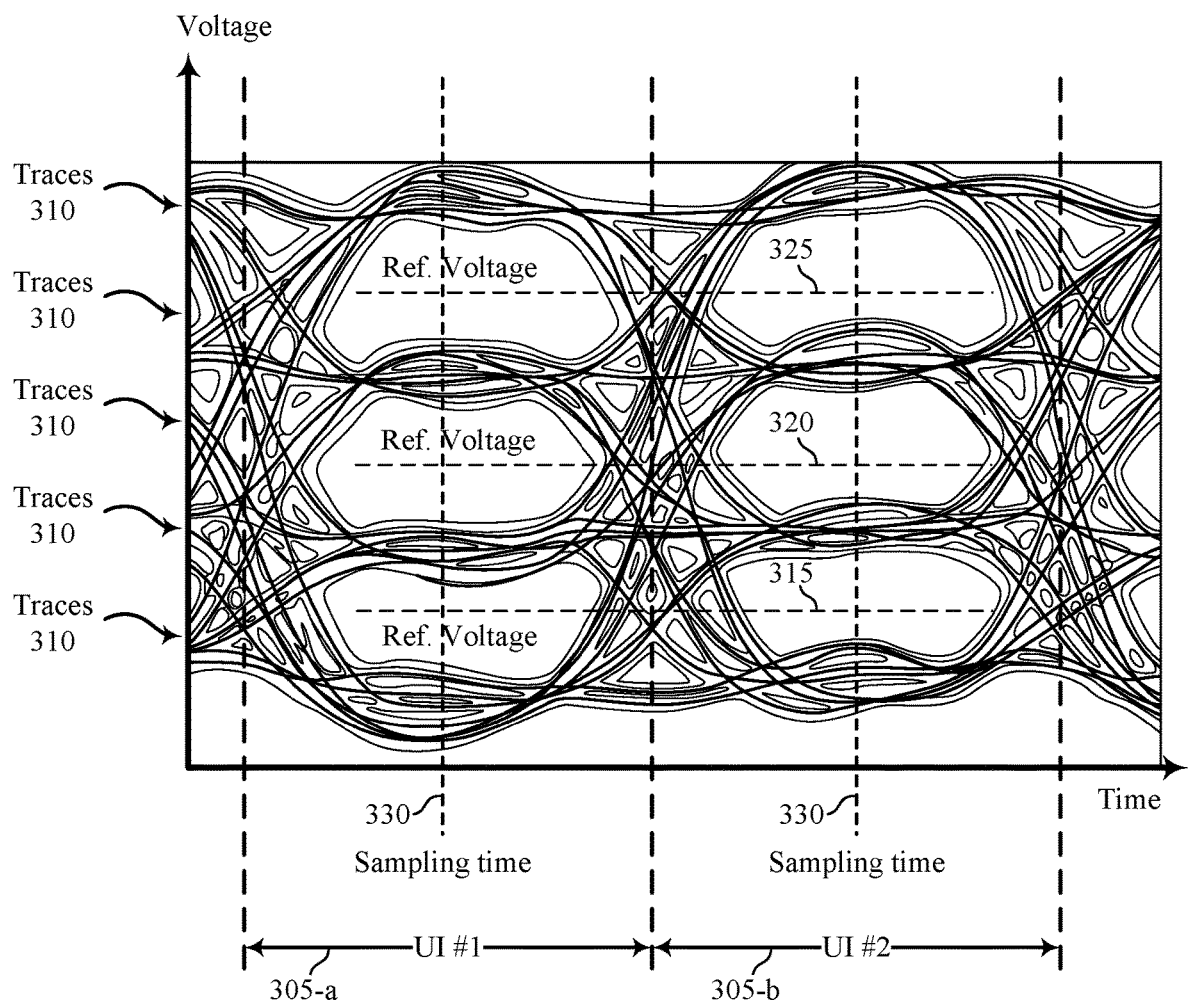
FIG. 3 illustrates an example of an eye diagram that supports a training procedure for receivers associated with a memory device in accordance with aspects of the present disclosure.

FIG. 3 illustrates an example of an eye diagram 300 that supports a training procedure for receivers associated with a memory device in accordance with aspects of the present disclosure. In some examples, the eye diagram 300 may illustrate implementation of aspects of system 100 or the memory die 200 described with reference to FIGS. 1 and 2.

The eye diagram 300 illustrates features of an eye diagram and how individualized training procedures may improve sensing techniques in a memory device. The eye diagram 300 shows two unit intervals 305-a and 305-b of four-state pulse amplitude modulation (PAM4) signaling as an example. The eye diagram 300 shows four distinct levels or symbols that may be communicated (e.g., across a conductor). Sometimes unit intervals may be referred to herein using the acronym "UI." To generate the eye diagram 300, an oscilloscope or other computing device may sample a digital signal according to a unit interval 305. The unit interval 305 may be defined by a clock associated with the transmission of the measured signal. In some examples, the oscilloscope or other computing device may measure the voltage level of the signal during the unit interval to form a trace 310. Noise and other factors can result in the traces 310 measured from the signal deviating from a set of ideal functions. The variations in the traces may represent the various possible signals on a data line that may be detected by a receiver.

In some examples, by overlaying a plurality of traces 310, various characteristics about the measured signal may be determined. For example, the eye diagram 300 may be used to identify different characteristics of a communication signals such as jitter, cross talk, electromagnetic interference (EMI), signal loss, signal-to-noise ratio (SNR), other characteristics, or combinations thereof. A closed eye may indicate a noisy and/or unpredictable signal.

The 'eye' of the eye diagram 300 may refer to the space between the traces 310. As the signals converge toward one of the four levels, areas between the levels may be devoid of traces 310, which may be referred to as eyes of the eye diagram 300. To distinguish between different levels when decoding a signal, reference voltages 315, 320, 325 may be positioned between the different levels represented by the traces. For example, a low-level reference voltage 315 may be positioned between a first level and a second level; a mid-level reference voltage 320 may be positioned between the second level and a third level; and a high-level reference voltage 325 may be positioned between the third level and a fourth level.

When decoding, the signals represented by the traces may be compared to the reference voltages 315, 320, 325 at a sampling time 330 that may be specific to each unit interval 305. The smaller the eye associated with each reference voltage 315, 320, 325 and each sampling time 330, the more likely that errors may be introduced into the detection. For example, an error (e.g., an incorrect value) may be detected if a signal for a first level inadvertently crosses the low-level reference voltage 315. In such examples, the receiver may determine that a second level is present, when in fact it the first level was present.

In some cases, training procedures may be initiated to modify the reference voltages and/or the sampling times of an entire block of unit intervals 305. During such training procedures, all the reference voltages 315, 320, 325 in a single block of unit intervals 305, or all of the sampling times 330 in a single block of unit intervals 305, or both may be adjusted together. Although such training procedures may improve the overall performance of a receiver measured over an entire block of unit intervals, certain symbols may experience increased error rates. Because of different slew rates, cross talk, duty cycles, and/or burst position mismatches, the characteristics of data eyes can be different for each different symbol or level.

Techniques for performing training procedures on individual symbols may be used to compensate for unique variations that may otherwise be present in different symbols. For example, an individual training operation may be performed for each reference voltage 315 within a single unit interval 305. These individual training operations may allow a low-level reference voltage 315 of the first unit interval 305-a to be positionable independent of the low-level reference voltage 315 of the second unit interval 305-b and/or positionable independent of a mid-level reference voltage 320 or a high-level reference voltage 325. In other examples, an individual training operation may be performed for the sampling time 330 associated with each reference voltage 315, 320, 325. These individual training operations may allow a sampling time 330 associated with low-level reference voltage 315 in the first unit interval 305-a to be positionable independent of a sampling time 330 associated with the mid-level reference voltage 320 in the first unit interval 305-a or the high-level reference voltage 325 in the first unit interval 305-a. In addition, these individual training operations may allow sampling times 330 in the first unit interval 305-a to be positionable independent of sampling times in other unit intervals (e.g., second unit interval 305-b).

Figure 4:
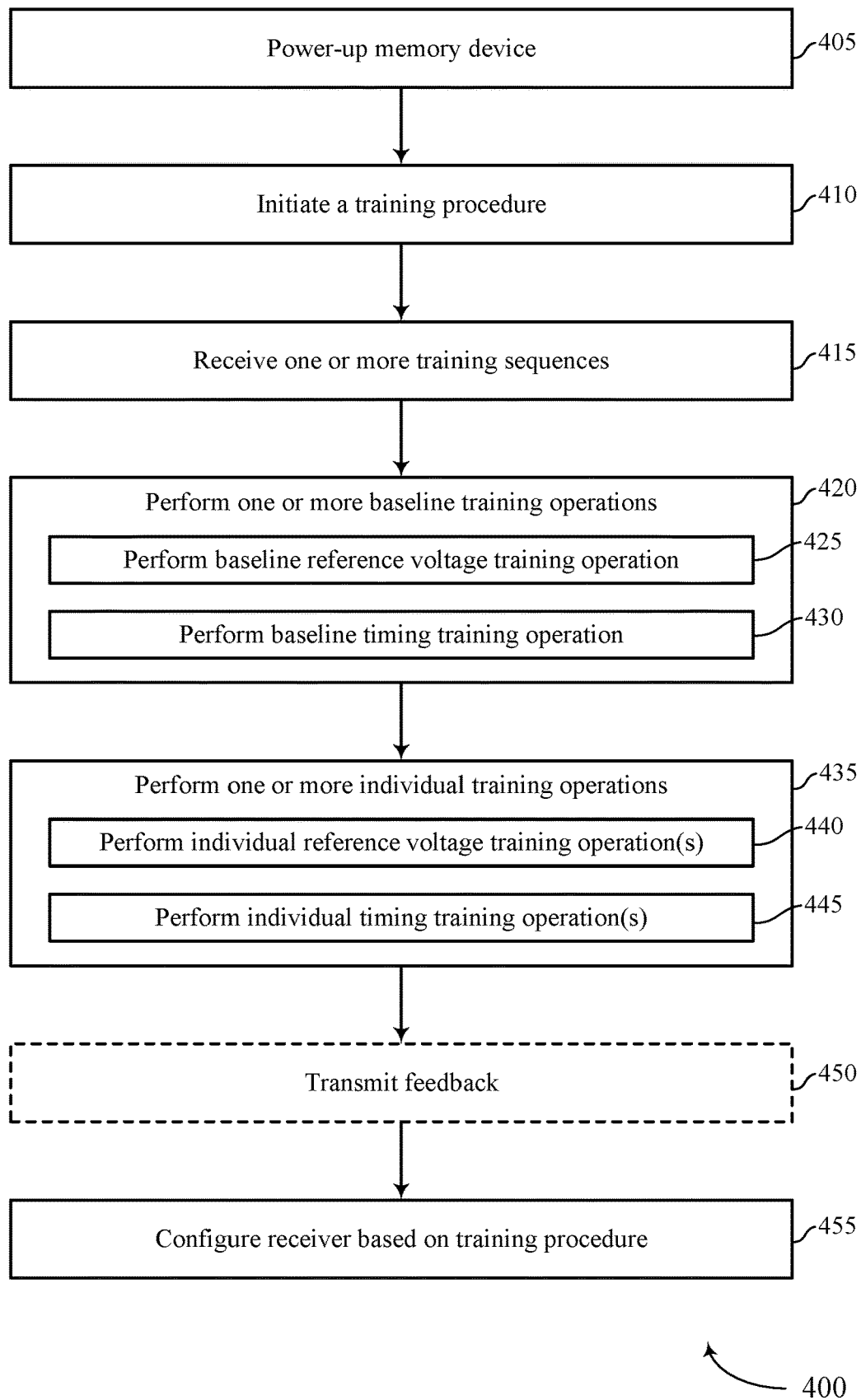
FIG. 4 illustrates an example of a flowchart that supports a training procedure for receivers associated with a memory device in accordance with aspects of the present disclosure.

FIG. 4 illustrates an example of a flowchart 400 that supports a training procedure for receivers associated with a memory device in accordance with aspects of the present disclosure. In some examples, the flowchart 400 may illustrate implementation of aspects of system 100 or the memory die 200 described with reference to FIGS. 1 and 2. The flowchart 400 illustrates one or more training procedures that may be performed by a receiver to independently configure reference voltages, sampling times, other parameters, or a combination thereof. The functions of the flowchart 400 may be performed by a host device or a memory device, among other examples.

At block 405, the memory device associated with a system may be powered-up. In some cases, the training procedures described herein may occur in conjunction with powering up the memory device.

At block 410, the host device or the memory device may initiate a training procedure. In some cases, the training procedure may be initiated based at least in part on determining that the memory device has been activated (e.g., after being deactivated). In some cases, the training procedure may be initiated after a period of inactivity, dormancy, or a sleep state or in other situations. These training procedures may, in some cases, be initiated for each conductive path or line extending between the host device and the memory device. For example, if a data channel has four data lines (e.g., x4), a training procedure may be initiated for each of the four data lines of the data channel.

At block 415, the receiver of the host device or the memory device may receive one or more training sequences (sometimes referred to as training bursts). A training burst may include a plurality of symbols communicated using a series of unit intervals. In some cases, the training burst may comprise a determined set of symbols. For example, a training burst may include a transmission of eight symbols using eight consecutive unit intervals. The symbols transmitted during the training burst may configured according to a training pattern. For example, the symbols of the training burst may be all the same type of symbol (e.g., all high-level symbols, high-mid-level symbols, low-mid-level symbols, or low-level symbols). In other examples, the symbols may be organized according to a determined pattern of signals (e.g., a pattern may comprise of the following symbols: high, high, mid, low, low, mid, high, mid).

The training procedure to refine each reference voltage and/or each sampling time may have at least two portions in some examples. During a first portion of the training procedure, the host device or memory device may train at least some if not all of the reference voltages together and/or at least some if not all of the sampling times together. During the first portion, the host device or memory device may identify a baseline reference voltage or a baseline adjustment to the reference voltage for each reference voltage. Additionally or alternatively, the host device or memory device may identify a baseline sampling time or a baseline adjustment to the sampling time for each sampling time in the training burst. During a second portion of the training procedure, the host device or memory device may train individual reference voltages, individual sampling times, or both. The procedures during the second portion may use the one or more baselines identified during the first portion. In this manner, the amount of time to do the individual training operations may be reduced. In effect, the baseline training operation may be used as a coarse refinement of the reference voltages and/or sampling times, and the individual training operations may be used to provide a finer refinement of individual reference voltages and/or individual sampling times.

At 420, the host device or the memory device may perform one or more baseline training operations. Examples of the baseline training operations may include a baseline reference voltage training operation and a baseline timing training operation.

At 425, the host device or the memory device may perform a baseline reference voltage training operation to identify a baseline level offset for a plurality of reference voltages used during a series of unit intervals. In some cases, the baseline offset may apply to every reference voltage in the series of unit intervals, while in other cases the baseline offset may apply to a subset of the reference voltages in the series of unit intervals. As discussed above, the reference voltages may be used to distinguish between different symbol candidates. By comparing a received signal to the reference voltage, the host device or memory device may be configured to determine whether the signal is a first symbol candidate (or below the first symbol candidate) or a second symbol candidate (or above the second symbol candidate). Symbol candidates may refer to a hypothesis of symbols associated with a reference voltage. By comparing the signal to the reference voltage, a receiver may identify one of the two symbol candidates as the likely symbol represented by the signal. In multi-symbol signals (e.g., PAM4) multiple reference voltages may be used to determine the actual symbol of a unit interval.

In some cases, to identify the baseline level offset, the host device or memory device may adjust one or more of the reference voltages until an error occurs. For example, the host device or the memory device may know beforehand which symbols are in the training burst. The host device or memory device may adjust (e.g., increase) one or more of the reference voltages until one or more errors occur with at least one of the reference voltage. An error may be a situation where the receiver identifies a symbol as a first symbol, when the receiver is actually expecting the symbol to be a second symbol different than the first symbol. When an error rate satisfies a threshold, the host device or the memory device may identify the voltage level of the reference voltage that is being used when the error rate satisfies the threshold as an upper bound of the reference voltages. An example of the threshold may a bit error rate threshold. The host device or memory device may also decrease the reference voltages until one or more errors occur with at least one of the reference voltage. When an error rate satisfies a threshold, the host device or the memory device may identify the voltage level of the reference voltage that is being used when the error rate satisfies the threshold as a lower bound of the reference voltages.

The host device or the memory device may identify a pass point between the upper-bound of the reference voltages and the lower-bound of the reference voltages (e.g., the midpoint). In some examples, the baseline level offset may represent a difference between the original level of the reference voltages and the pass point of the reference voltages identified by the baseline voltage training operation. To move the reference voltages to the baseline value, the baseline level offset may be applied to the original reference voltage values.

In some cases, the difference between the upper-bound of the reference voltages and the lower-bound of the reference voltages may be referred to as a pass window. The baseline level offset may be configured to position the reference voltages at the pass point identified in the pass window.

At 430, the host device or the memory device may perform a baseline timing training operation to identify a baseline timing offset for a plurality of sampling times used during a series of unit intervals. In some cases, the baseline timing offset may apply to every sampling time in the series of unit intervals. The sampling time may refer to the time during a unit interval that a signal is compared to one or more reference voltages. Sometimes the sampling time of a unit interval may affect the quantity of errors detected when reading the signal received over the conductive path by the receiver.

In some cases, to identify the baseline timing offset, the host device or memory device may adjust the sampling time for at least some if not every unit interval in a series of unit intervals at once. The host device or the memory device may identify a pass point for the sampling time. If no pass point is identified, the host device or memory device may repeat the procedure but at a lower speed. The host device or the memory device may adjust the sampling time until an error occurs. For example, the host device or the memory device may know beforehand which symbols are in the training burst. The host device or memory device may adjust (e.g., increase) the sampling time until one or more errors occur with at least one sampling time in one unit interval. When an error rate satisfies a threshold, the host device or the memory device may identify the sampling time that is being used when the error rate satisfies the threshold as an upper bound of the sampling times. The host device or memory device may also adjust (e.g., decrease) the sampling times until one or more errors occur with at least one sampling time in one unit interval. When an error rate satisfies a threshold, the host device or the memory device may identify the sampling time that is being used when the error rate satisfies the threshold as a lower bound of the sampling times.

The host device or the memory device may identify a pass-point between the upper-bound of the sampling times and the lower-bound of the sampling times (e.g., the midpoint). The baseline timing offset may represent a difference between the original timing of the sampling times and the pass point of the sampling times identified by the baseline timing training operation. To move the sampling times to the baseline value, the baseline timing offset may be applied to the original sampling times.

At 435, the host device or memory device may perform one or more individual training operations to refine the reference voltages and/or the latching times. In some cases, the individual training operations may use one or more of the baseline offsets (e.g., baseline level offset, baseline timing offset, both offsets, other offsets) as starting points for the training operations. Examples of the individual training operations may include individual reference voltage training operation(s) and individual timing training operation(s).

At 440, the host device or memory device may perform one or more individual level training operations. An individual level training operation may be used identify an individual level offset for a specific reference voltage in a specific unit interval. As an example, a first individual level training operation may be used to determine a first individualized level offset for the first reference voltage 315 found in the first unit interval 305-a and a second individual level training operation may be used to determine a second individualized level offset for the first reference voltage 315 found in the second unit interval 305-b. Similarly, a first individual level training operation may be used to determine a first individualized level offset for the first reference voltage 315 found in the first unit interval 305-a and a second individual level training operation may be used to determine a second individualized level offset for the second reference voltage 320 found in the first unit interval 305-a.

In some cases, an individual level training operation may be used to determine a level offset for a plurality of reference voltages. For example, an individual level training operation may be used to identify a common level offset for at least some reference voltages or each reference voltage (e.g., reference voltages 315, 320, and 325) in a single unit interval. The plurality of reference voltages served by a single individual level offset may be any combination of reference voltages in any unit intervals.

An individual level training operation may be performed similarly as the baseline level training operation. In such cases, an individual level training operation may identify upper and lower bounds for the reference voltages in question and may identify a pass point that is between the upper and lower bounds. The individual level training operations may include other features of the baseline level training operation.

At 445, the host device or memory device may perform one or more individual timing training operations. An individual timing training operation may be used identify an individual timing offset for a specific sample time in a specific unit interval. As an example, a first individual timing training operation may be used to determine a first individualized timing offset associated with sampling the first reference voltage 315 found in the first unit interval 305-a and a second individual timing training operation may be used to determine a second individualized timing offset associated with sampling the second reference voltage 320 found in the first unit interval 305-a. Similarly, a first individual timing training operation may be used to determine a first individualized timing offset associated with sampling the first reference voltage 315 found in the first unit interval 305-a and a second individual timing training operation may be used to determine a second individualized timing offset associated with sampling the first reference voltage 315 found in the second unit interval 305-b.

In some cases, an individual timing training operation may be used to determine a timing offset for a plurality of sample times. For example, an individual timing training operation may be used to identify a common timing offset associated with sampling at least some reference voltages or each reference voltage (e.g., reference voltages 315, 320, and 325) in a single unit interval. The plurality of sampling times served by a single individual timing offset may be any combination of sampling times associated with any reference voltages in any unit intervals.

An individual timing training operation may be performed similar to the baseline timing training operation. In such cases, an individual timing training operation may identify upper and lower bounds for the sampling times in question and may identify a pass point that is between the upper and lower bounds. The individual timing training operations may include other features of the baseline timing training operation.

At 450, the host device or the memory device may transmit feedback to the transmitting device (e.g., host device or memory device) during the training procedure. In some examples, the training procedure may be initiated (e.g., run) by an external memory controller of a host device. When the receiver being trained is part of the memory device, the memory device may transmit one or more checksums or error correction data to indicate when errors have occurred. The external memory controller of the host device may use the checksums or error correction data to identify upper and lower bounds of reference voltages and/or sampling times and to identify pass points and/or offsets (e.g., baseline level offset, baseline timing offset, individual level offsets, and/or individual timing offsets). In some examples, the determination of pass points, offsets, and other information for the training procedure may be performed by the memory device (e.g., device memory controller or one or more local memory controllers).

At 455, the host device or the memory device may configure or initiate configuration of the receiver based on the outcome of the training procedure. For example, the host device or the memory device may take an original reference voltage level and apply a baseline level offset, or an individual level offset, or both. In some cases, the individual level offset or individual timing offset may already incorporate the baseline offsets. In such cases, the host device or the memory device may apply the individual offset (e.g., individual level offset or individual timing offset) to an original value (e.g., original reference voltage level or individual sampling time). In some cases, the individual offset may represent a difference between an individual level or time and the baseline level or time. In such cases, the host device or the memory device may apply the individual offset (e.g., individual level offset or individual timing offset) and the baseline offset (e.g., baseline level offset or baseline timing offset) to an original value (e.g., original reference voltage level or individual sampling time).

In some cases, level training may be performed for one or more conductive paths (e.g., data lines) concurrently, or at the same time. In some cases, timing training may be performed for one or more conductive paths (e.g., data lines) concurrently, or at the same time.

Figure 5A:
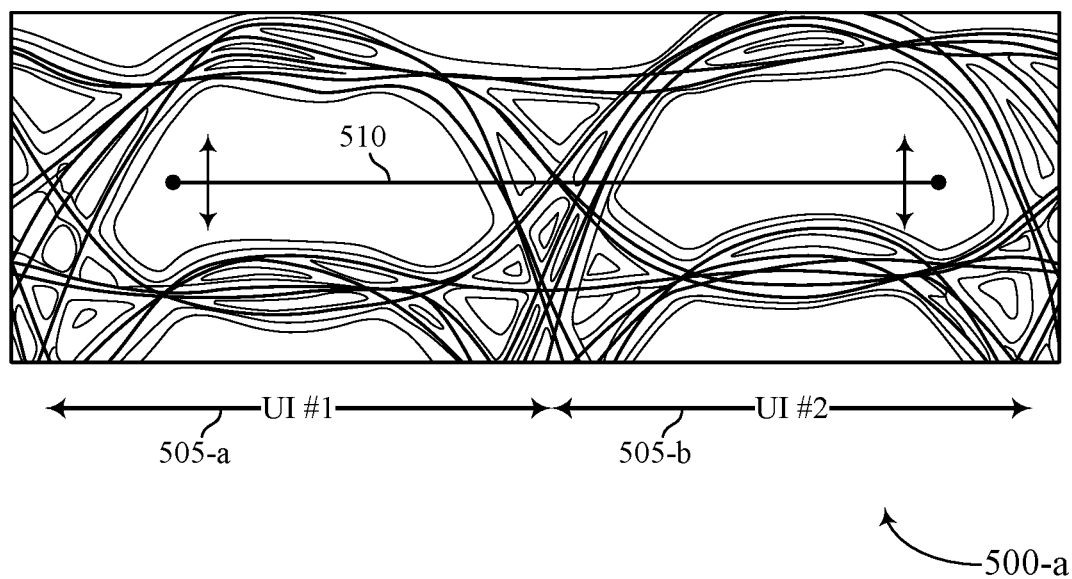
FIGS. 5A and 5B illustrate examples of eye diagrams that support a training procedure for receivers associated with a memory device in accordance with aspects of the present disclosure.
Figure 5B:
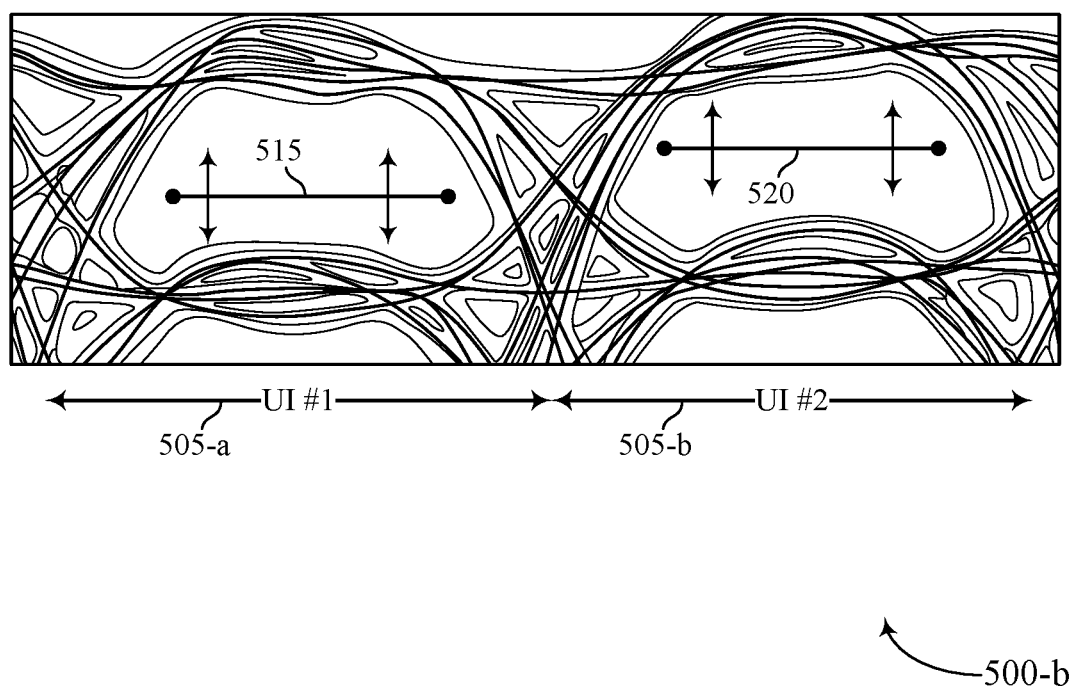

FIGS. 5A and 5B illustrate examples of eye diagrams 500 that support a training procedure for receivers associated with a memory device in accordance with aspects of the present disclosure. In some examples, the eye diagrams 500 may illustrate implementation of aspects of system 100 or the memory die 200 described with reference to FIGS. 1 and 2. The eye diagrams 500 each show different aspects of the training procedure. The first eye diagram 500-*a* shows an example of a baseline level training operation and the second eye diagram 500-*b* shows two examples of individual level training operations. The eye diagrams 500 show a binary symbol signal across two unit intervals 505 (e.g., a first unit interval 505-*a* and a second unit interval 505-*b*) to simplify the description. The principles described herein, however, may be expanded to apply to binary-symbol signals transmitted across a plurality of unit intervals and/or multi-symbol signals transmitted across a plurality of unit intervals.

The first eye diagram 500-*a* shows how a baseline level training operation may affect a common reference voltage 510 used to distinguish between symbol candidates in the first unit interval 505-*a* and the second unit interval 505-*b*. During a baseline level training operation, the common reference voltage 510 may be adjusted for both unit intervals. For example, a baseline level offset may be applied to the common reference voltage 510 such that the reference voltage for the first unit interval 505-*a* may be identical to the reference voltage for the second unit interval 505-*b*. As such, conditions in the second unit interval 505-*b* may prevent the common reference voltage 510 from being positioned in an ideal position for the first unit interval 505-*a*, or vice-versa.

The second eye diagram 500-*b* shows how two individual level training operations may affect two reference voltages 515 and 520 used to distinguish between symbol candidates in the first unit interval 505-*a* and the second unit interval 505-*b*, respectively. During a first individual level training operation, the reference voltage 515 of the first unit interval 505-*a* may be adjusted. During a second individual level training operation, the reference voltage 520 of the second unit interval 505-*b* may be adjusted independent of an adjustment of the reference voltage 515. In such examples, a first individual level offset may be applied to the first reference voltage 515 and a second individual level offset, different than the first level offset, may be applied to the second reference voltage 520. In such a manner, the reference voltage 515, 520 for each unit interval 505-*a*, 505-*b* may be set to an ideal position independent of the other reference voltage.

Figure 6A:
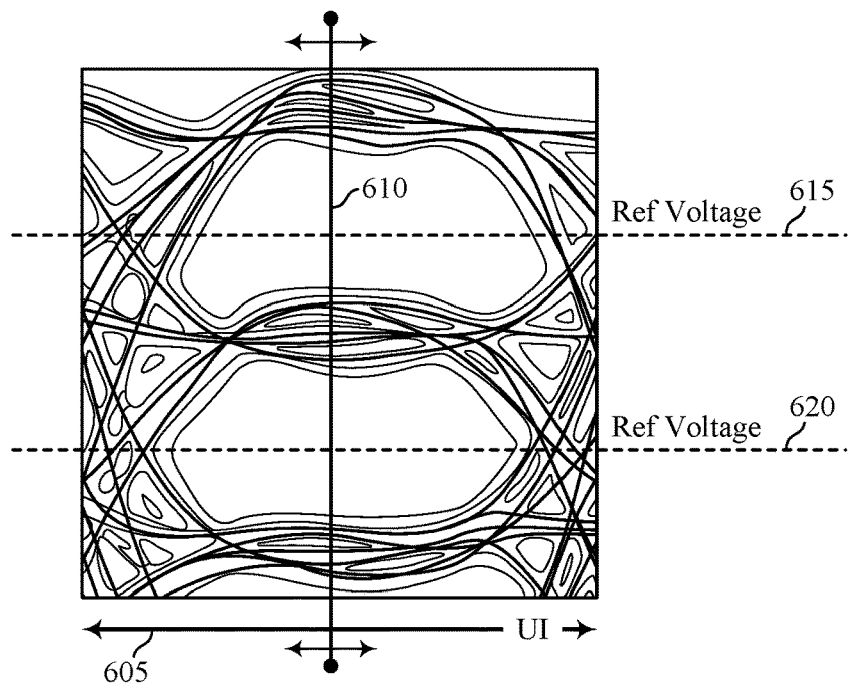
FIGS. 6A and 6B illustrate examples of eye diagrams that support a training procedure for receivers associated with a memory device in accordance with aspects of the present disclosure.
Figure 6B:
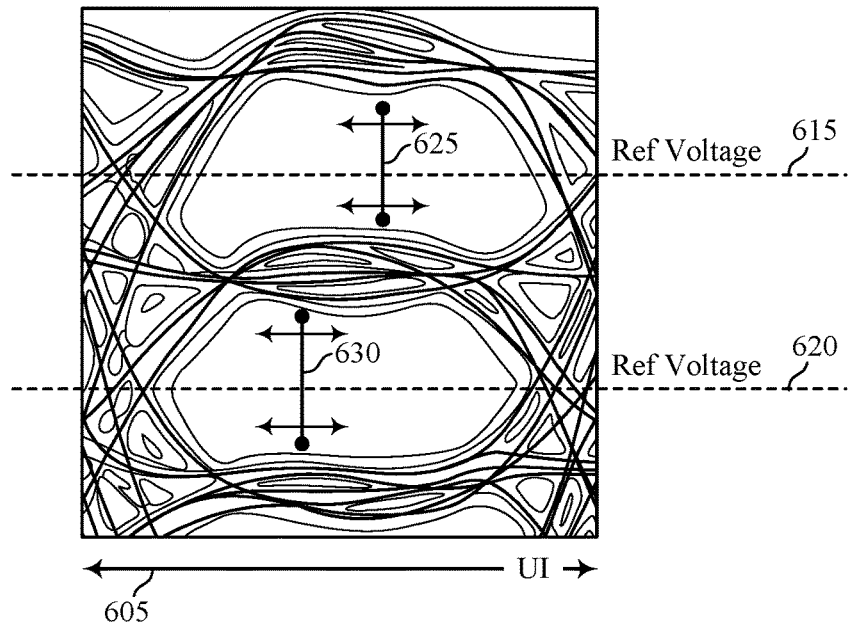

FIGS. 6A and 6B illustrate examples of eye diagrams 600 that supports training procedure for receivers in accordance with aspects of the present disclosure. In some examples, the eye diagrams 600 may illustrate implementation of aspects of system 100 or the memory die 200 described with reference to FIGS. 1 and 2. The eye diagrams 600 each show different aspects of the training procedure. The first eye diagram 600-*a* shows an example of a baseline timing training operation and the second eye diagram 600-*b* shows two examples of individual timing training operations. The eye diagrams 600 show a binary symbol signal across one unit intervals 605 to simplify the description. The principles described herein, however, may be expanded to apply to binary-symbol signals transmitted across a plurality of unit intervals and/or multi-symbol signals transmitted across a plurality of unit intervals.

The first eye diagram 600-*a* shows how a baseline timing training operation may affect a common sampling time 610 used to sample a signal and compare a signal to both a first reference voltage 615 and a second reference voltage 620 in the unit interval. During a baseline timing training operation, the common sampling time 610 may be adjusted for reference voltages 615 and 620. For example, a baseline timing offset may be applied to the common sampling time 610 such that the timing for comparing the signal to the first reference voltage 615 and the time for comparing the signal to the second reference voltage 620 is identical. As such, conditions of the eye associated with the first reference voltage 615 may prevent the common sampling time 610 from being positioned in an ideal position for the eye associated with the second reference voltage 620, or vice-versa.

The second eye diagram 600-*b* shows how two individual timing training operations may affect the sampling and comparing a signal to two reference voltages 615 and 620 at two different sampling times (e.g., a first sampling time 625 and a second sampling time 630). During a first individual timing training operation, the sampling time 625 associated with the first reference voltage 615 may be adjusted. During a second individual timing training operation, the sampling time 630 associated with the second reference voltage 620 may be adjusted independent of an adjustment of the sampling time 625. In such examples, a first individual timing offset may be applied to the sampling time 625 and a second individual timing offset, different than the first timing offset, may be applied to the second sampling time 630. In such a manner, the sampling times 625, 630 associated with each reference voltage 615, 620 in the unit interval may be set to an ideal position independent of the other sampling time.

Figure 7:
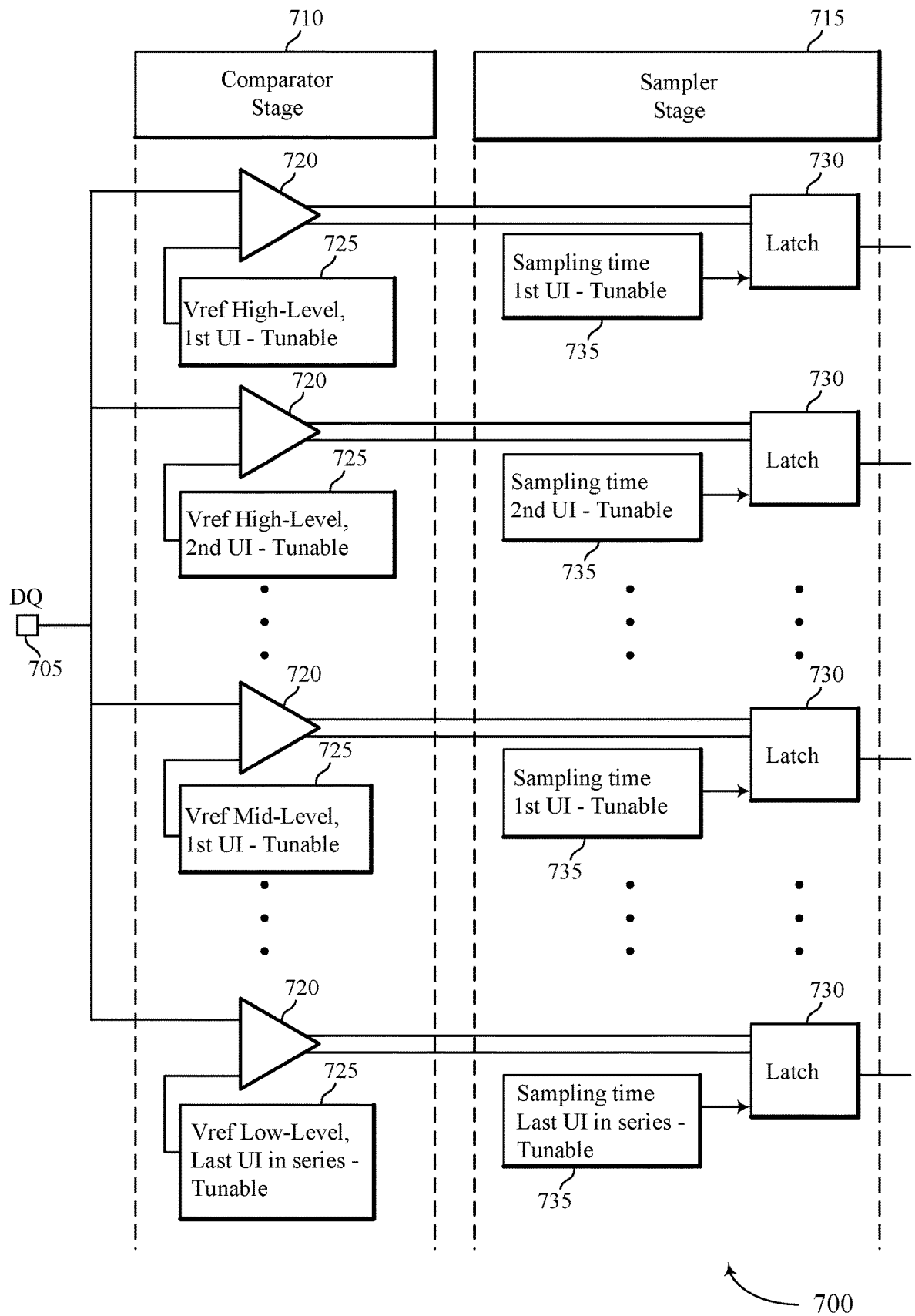
FIG. 7 illustrates an example of a circuit diagram that supports a training procedure for receivers associated with a memory device in accordance with aspects of the present disclosure.

FIG. 7 illustrates an example of a circuit diagram 700 that supports training procedure for receivers in accordance with aspects of the present disclosure. In some examples, the circuit diagram 700 may implement aspects of system 100 or the memory die 200 described with reference to FIGS. 1 and 2. The circuit diagram 700 shows a receiver coupled with a single conductive line 705 (e.g., a DQ line and sometimes referred to as a pin) at a host device or a memory device. The receiver may be configured to determine a symbol transmitted on the conductive line 705. The receiver may include components configured to perform one or more training procedures including baseline training operations (e.g., level, timing), individual training operations (e.g., level, timing), or both.

The circuit diagram 700 shows the structure of a receiver for a single conductive line 705. Similar structures may be used for other conductive lines in a system.

The receiver may include two stages, which may include a comparator stage 710 and a sampler stage 715. The comparator stage 710 may include one or more comparators 720 configured to compare a signal received (e.g., using the conductive line 705) to a reference voltage 725. In some cases, the reference voltage 725 may be tunable. In some cases, the comparators 720 may have a differential output. In some cases, the comparators may have a single-ended output.

The sampler stage 715 may include one or more latches 730 configured to latch and/or store an output of the comparators 720. Inputs of a latch 730 may be coupled with an output of a comparator 720 (differential or single-ended) and a sampling time 735. When the sampling time signal registers an activation command, the latch 730 may be activated and may output a signal to a controller. The sampling time 735 may be associated with a specific reference voltage. In some cases, the sampling time may be tunable. The controller may receive information from each latch 730 in the sampler stage 715. The controller may use that information from the latches 730 to determine a symbol being transmitted across the conductive line 705 during a unit interval or a plurality of symbols being transmitted across the conductive line 705 during a series of unit intervals.

The circuit diagram 700 of the receiver shows components needed to detect a plurality of reference signals across a plurality of unit intervals concurrently. Some receivers may be configured to decode a plurality of unit intervals at the same time. For example, if a common word length of a signal is eight symbols, a receiver may be configured to decode eight unit intervals concurrently. To accomplish this, additional components may be added to the receiver. In addition, as the quantity of possible symbols being transmitted increases, the quantity of comparators and reference voltages may also increase.

The first row of components of the circuit diagram 700 shows a comparator stage 710 and a sampler stage 715 associated with comparing the received signal to a reference voltage for a high-level (e.g., reference voltage 325 described with reference to FIG. 3) for a first unit interval (e.g., the first unit interval 305-*a* described with reference to FIG. 3). The second row of components of the circuit diagram 700 shows a comparator stage 710 and a sampler stage 715 associated with comparing the received signal to a reference voltage for a high-level (e.g., reference voltage 325 described with reference to FIG. 3) for a second unit interval (e.g., the second unit interval 305-*b* described with reference to FIG. 3).

Although not shown, the receiver may include additional rows for each unit interval that the receiver can decode (e.g., decode concurrently). For example, if the receiver can decode eight unit intervals (e.g., concurrently), there may be eight rows of components associated with the reference voltage for a high-level (e.g., reference voltage 325 described with reference to FIG. 3). A receiver may be built decode any quantity of unit intervals at once. As such, there may be any quantity of rows of components associated with the reference voltage for a high-level (e.g., one row, two rows, three rows, four rows, five rows, six rows, seven rows, eight rows, and so forth).

In the circuit diagram 700, each reference voltage 725 may be tunable (e.g., independently tunable) and each sampling time 735 may be tunable (e.g., independently tunable). Such a configuration may allow for training procedures that provide one or more offsets (e.g., level offsets and/or timing offsets) for specific reference voltages in specific unit intervals.

The structure associated with recoding the reference voltage for a high-level may be replicated for additional reference voltages. For example, the third row shown in the circuit diagram 700 includes components associated with the reference voltage for a mid-level (e.g., reference voltage 320 described with reference to FIG. 3). The components and the rows of components associated with the mid-level reference voltage may be configured similarly as the components for the high-level, except the reference voltage input to the comparators 720 may be different than for the high-level.

The receiver may be configured to decode a signal using any quantity of reference signals. In some examples, the signal(s) transmitted across the conductive line 705 may be a PAM4 signal or signals. As such, there may be three distinct reference voltages (e.g., high, mid, and low). The structures and components described above may be extended to use any quantity of reference voltages and/or any quantity of unit intervals.

Having each reference voltage 725 and each sampling time 735 be independently configurable allows the training procedure to perform individual level training operations and individual timing training operations as described above. For example, when performing a baseline level training operation, at least some if not all reference voltages 725 of the receiver may be adjusted together. When performing an individual level training operation, one or more of the reference voltages 725 may be adjusted (e.g., at the same time, concurrently, simultaneously). Similarly, when performing a baseline timing training operation, at least some if not all sampling times 735 of the receiver may be adjusted together. When performing an individual timing training operation, one or more of the sampling times 735 may be adjusted (e.g., at the same time, concurrently, simultaneously).

In some cases, each reference voltage 725 and/or each sampling time 735 may not be independently tunable or configurable. In some instances, reference voltages 725 and/or sampling times 735 may be grouped into configurable sets (e.g., independently configurable sets). For example, the high-level reference voltage (e.g., reference voltage 325 described with reference to FIG. 3), may not be independently tunable for each unit interval, but instead may be tunable across some or all of the unit intervals. When such is the case, components shown in the circuit diagram 700 may be combined and/or rearranged. Another example of a group of configurable variables may be that a sampling time 735 for a single unit interval may be configurable, but sampling times 735 associated within individual reference voltages 725 may not be independently configurable. Any combination of reference voltages 725 and/or sampling times 735 may be grouped together for tuning purposes. When such is the case, components shown in the circuit diagram 700 may be combined and/or rearranged.

Figure 8:
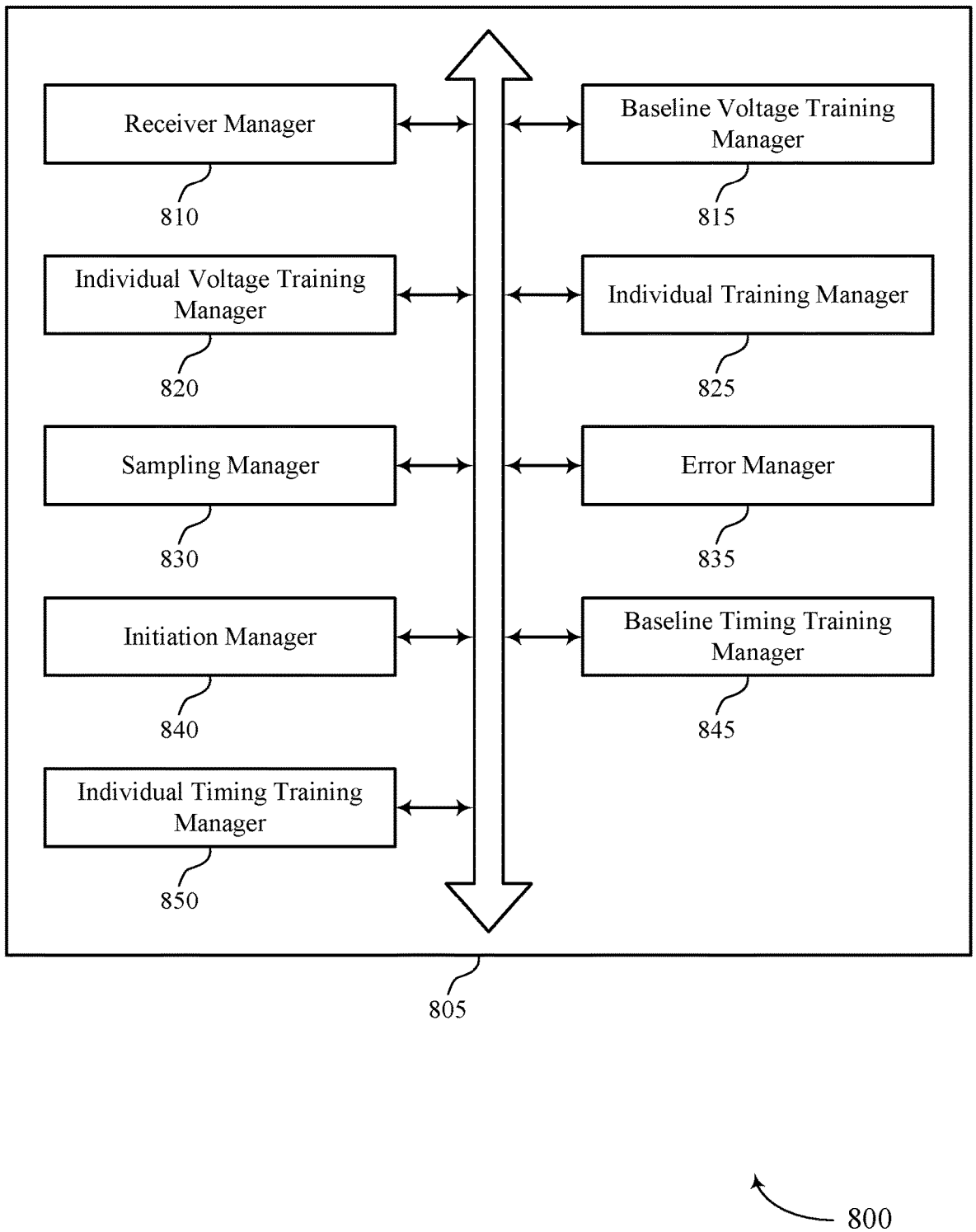
FIG. 8 illustrates a block diagram of a device that supports a training procedure for receivers associated with a memory device in accordance with aspects of the present disclosure.

FIG. 8 shows a block diagram 800 of a training manager 805 that supports training procedure for receivers in accordance with aspects of the present disclosure. The functions of the training manager 805 may be performed by a controller (e.g., external memory controller 105, device memory controller 155, local memory controller 165, local memory controller 260, or a combination thereof) as described with reference to FIGS. 1 and 2. The training manager 805 may include a receiver manager 810, a baseline voltage training manager 815, an individual voltage training manager 820, an individual training manager 825, a sampling manager 830, an error manager 835, an initiation manager 840, a baseline timing training manager 845, and an individual timing training manager 850. Each of these modules may communicate, directly or indirectly, with one another (e.g., via one or more buses).

The receiver manager 810 may receive a set of symbols during a series of unit intervals, each unit interval of the series including one symbol of the set of symbols. In some examples, the receiver manager 810 may configure the first reference voltage in the first unit interval with the first level offset and the first reference voltage in the second unit interval with the second level offset. In some examples, the receiver manager 810 may receive a set of symbols over a series of unit intervals, each unit interval of the series including one symbol of the set of symbols.

In some examples, the receiver manager 810 may configure the first sampling time with the first timing offset and the second sampling time with the second timing offset. In some examples, the receiver manager 810 may configure the second reference voltage in the first unit interval with the third level offset. In some examples, the receiver manager 810 may receive a set of training bursts to identify level offsets for individual reference voltages associated with individual unit intervals of the series, where a single training burst of the set include the set of symbols. In some examples, receiving, during the training procedure, a set of training bursts, each training burst including a set of predetermined symbols, where a single training burst includes the set of symbols.

The baseline voltage training manager 815 may identify a baseline level offset associated with a first reference voltage for distinguishing a first symbol candidate from a second symbol candidate in the set of symbols. In some examples, the baseline voltage training manager 815 may apply the baseline level offset to the first reference voltage for the unit intervals of the series. In some cases, the baseline level offset includes an initial value and the first level offset and the second level offset are identified based on the initial value.

The individual voltage training manager 820 may identify a first level offset for the first reference voltage in a first unit interval of the series and a second level offset for the first reference voltage in a second unit interval of the series after identifying the baseline level offset, the first level offset being different than the second level offset.

The individual training manager 825 may identify a third level offset for a second reference voltage in the first unit interval of the series after identifying the baseline level offset, the third level offset being different than the first level offset and the second level offset.

The sampling manager 830 may sample, during the first unit interval, a first output of a first comparator associated with the first reference voltage based on the first level offset and the first reference voltage.

The error manager 835 may adjust the first reference voltage for the first unit interval. In some examples, the error manager 835 may determine that an error occurred when demodulating a symbol of the set of symbols based on adjusting the first reference voltage, where the first level offset is identified based on determining that the error occurs. In some examples, the error manager 835 may transmit an indication the error occurred, where the first level offset is identified based on transmitting the indication.

In some examples, the error manager 835 may adjust the first sampling time for the first unit interval. In some examples, the error manager 835 may determine that an error occurred when demodulating a symbol of the set of symbols based on adjusting the first sampling time, where the first timing offset is identified based on determining that the error occurs. In some examples, the error manager 835 may transmit a checksum that indicates that the error occurred, where the first timing offset is identified based on transmitting the checksum.

The initiation manager 840 may initiate a training procedure including a baseline level training procedure and a set of individual level training procedures, where receiving the set of symbols is based on initiating the training procedure. In some examples, the initiation manager 840 may initiate a training procedure for determining the baseline timing offset and individual timing offsets, where receiving the set of symbols is based on initiating the training procedure. In some cases, the training procedure is initiated for each pin of a channel. In some cases, the training procedure is initiated for each data pin of a channel.

The baseline timing training manager 845 may identify a baseline timing offset associated with a sampling time for latching during the series of unit intervals. In some examples, the baseline timing training manager 845 may apply the baseline timing offset to the sampling time for the unit intervals of the series. In some cases, the baseline timing offset includes an initial value and the first timing offset and the second timing offset are identified based on the initial value.

The individual timing training manager 850 may identify a first timing offset for a first sampling time in a first unit interval of the series and a second timing offset for a second sampling time in a second unit interval of the series after identifying the baseline timing offset, the first timing offset being different than the second timing offset. In some examples, the individual timing training manager 850 may sample, during the first unit interval, a first output of a first comparator associated with the first reference voltage at a first time based on the first sampling time and the first timing offset. In some examples, the individual timing training manager 850 may sample, during the first unit interval, a second output of a second comparator associated with the second reference voltage at a second time different than the first time, the second time being based on the first sampling time and the third timing offset.

Figure 9:
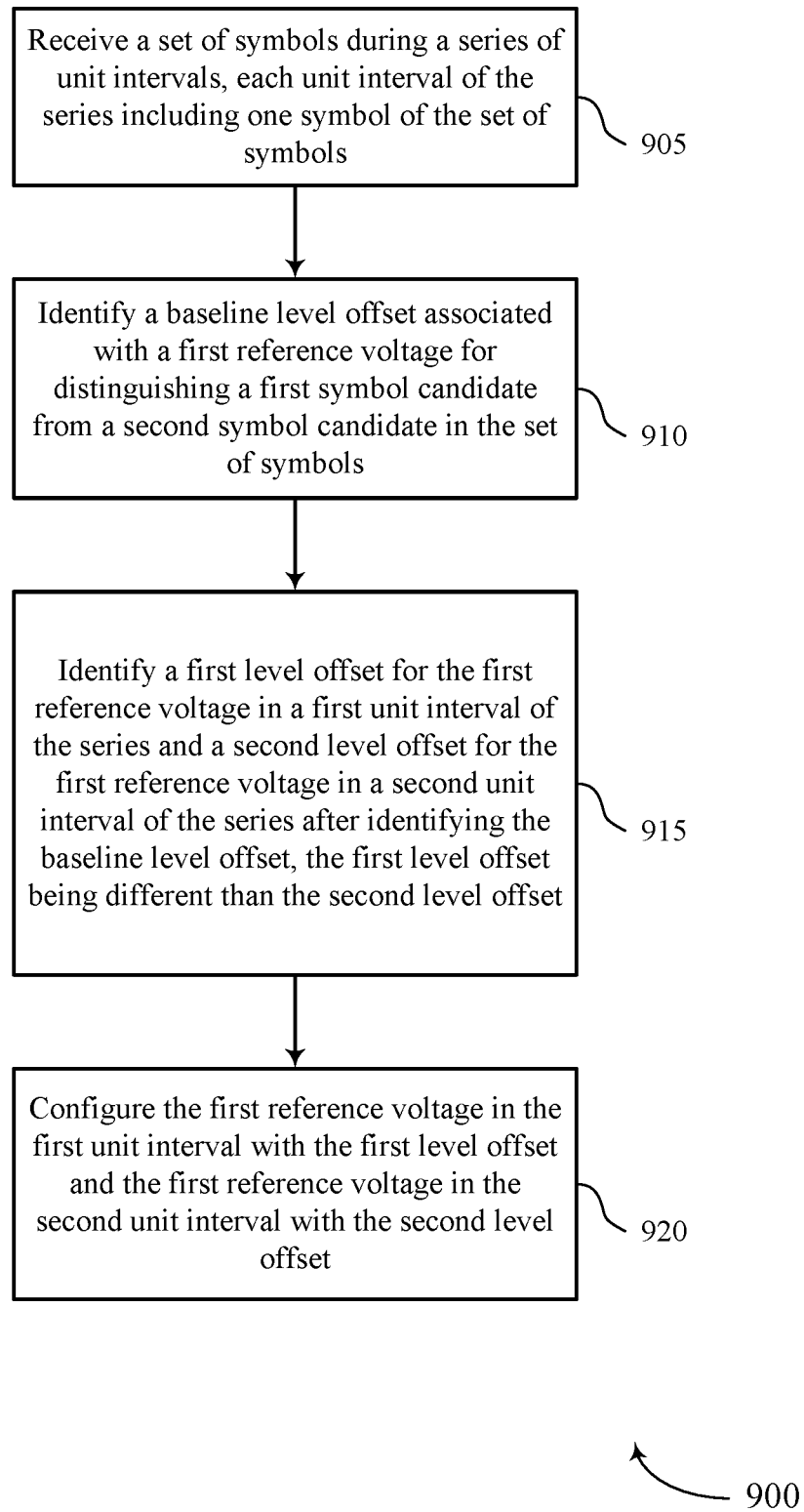
FIGS. 9 through 12 show flowcharts illustrating a method or methods that support a training procedure for receivers associated with a memory device in accordance with aspects of the present disclosure.

FIG. 9 shows a flowchart illustrating a method 900 that supports training procedure for receivers in accordance with aspects of the present disclosure. The operations of method 900 may be implemented by a controller (e.g., external memory controller 105, device memory controller 155, local memory controller 165, local memory controller 260, or a combination thereof) or its components as described herein. For example, the operations of method 900 may be performed by a training manager as described with reference to FIG. 8. In some examples, a controller may execute a set of instructions to control the functional elements of the controller to perform the functions described below. Additionally or alternatively, a controller may perform aspects of the functions described below using special-purpose hardware.

At 905, the controller may receive a set of symbols during a series of unit intervals, each unit interval of the series including one symbol of the set of symbols. In some examples, aspects of the operations of 905 may be performed by a receiver manager as described with reference to FIG. 8.

At 910, the controller may identify a baseline level offset associated with a first reference voltage for distinguishing a first symbol candidate from a second symbol candidate in the set of symbols. In some examples, aspects of the operations of 910 may be performed by a baseline voltage training manager as described with reference to FIG. 8.

At 915, the controller may identify a first level offset for the first reference voltage in a first unit interval of the series and a second level offset for the first reference voltage in a second unit interval of the series after identifying the baseline level offset, the first level offset being different than the second level offset. In some examples, aspects of the operations of 915 may be performed by an individual voltage training manager as described with reference to FIG. 8.

At 920, the controller may configure the first reference voltage in the first unit interval with the first level offset and the first reference voltage in the second unit interval with the second level offset. In some examples, aspects of the operations of 920 may be performed by a receiver manager as described with reference to FIG. 8.

An apparatus as described herein may perform a method or methods, such as the method 900. The apparatus may include features, means, or instructions (e.g., a non-transitory computer-readable medium storing instructions executable by a processor) for receiving a set of symbols during a series of unit intervals, each unit interval of the series including one symbol of the set of symbols, identifying a baseline level offset associated with a first reference voltage for distinguishing a first symbol candidate from a second symbol candidate in the set of symbols, identifying a first level offset for the first reference voltage in a first unit interval of the series and a second level offset for the first reference voltage in a second unit interval of the series after identifying the baseline level offset, the first level offset being different than the second level offset, and configuring the first reference voltage in the first unit interval with the first level offset and the first reference voltage in the second unit interval with the second level offset.

Some examples of the method or apparatus may further include operations, features, means, or instructions for identifying a third level offset for a second reference voltage in the first unit interval of the series after identifying the baseline level offset, the third level offset being different than the first level offset and the second level offset and configuring the second reference voltage in the first unit interval with the third level offset.

Some examples of the method or apparatus may further include operations, features, means, or instructions for sampling, during the first unit interval, a first output of a first comparator associated with the first reference voltage based on the first level offset and the first reference voltage.

Some examples of the method or apparatus may further include operations, features, means, or instructions for adjusting the first reference voltage for the first unit interval and determining that an error occurred when demodulating a symbol of the set of symbols based on adjusting the first reference voltage, where the first level offset may be identified based on determining that the error occurs.

Some examples of the method or apparatus may further include operations, features, means, or instructions for transmitting an indication the error occurred, where the first level offset may be identified based on transmitting the indication.

Some examples of the method or apparatus may further include operations, features, means, or instructions for initiating a training procedure including a baseline level training procedure and a set of individual level training procedures, where receiving the set of symbols may be based on initiating the training procedure.

In some examples of the method or apparatus described herein, the training procedure may be initiated for each pin of a channel.

Some examples of the method or apparatus may further include operations, features, means, or instructions for receiving a set of training bursts to identify level offsets for individual reference voltages associated with individual unit intervals of the series, where a single training burst of the set include the set of symbols.

In some examples of the method or apparatus described herein, the baseline level offset includes an initial value and the first level offset and the second level offset may be identified based on the initial value.

Some examples of the method or apparatus may further include operations, features, means, or instructions for applying the baseline level offset to the first reference voltage for the unit intervals of the series.

Figure 10:
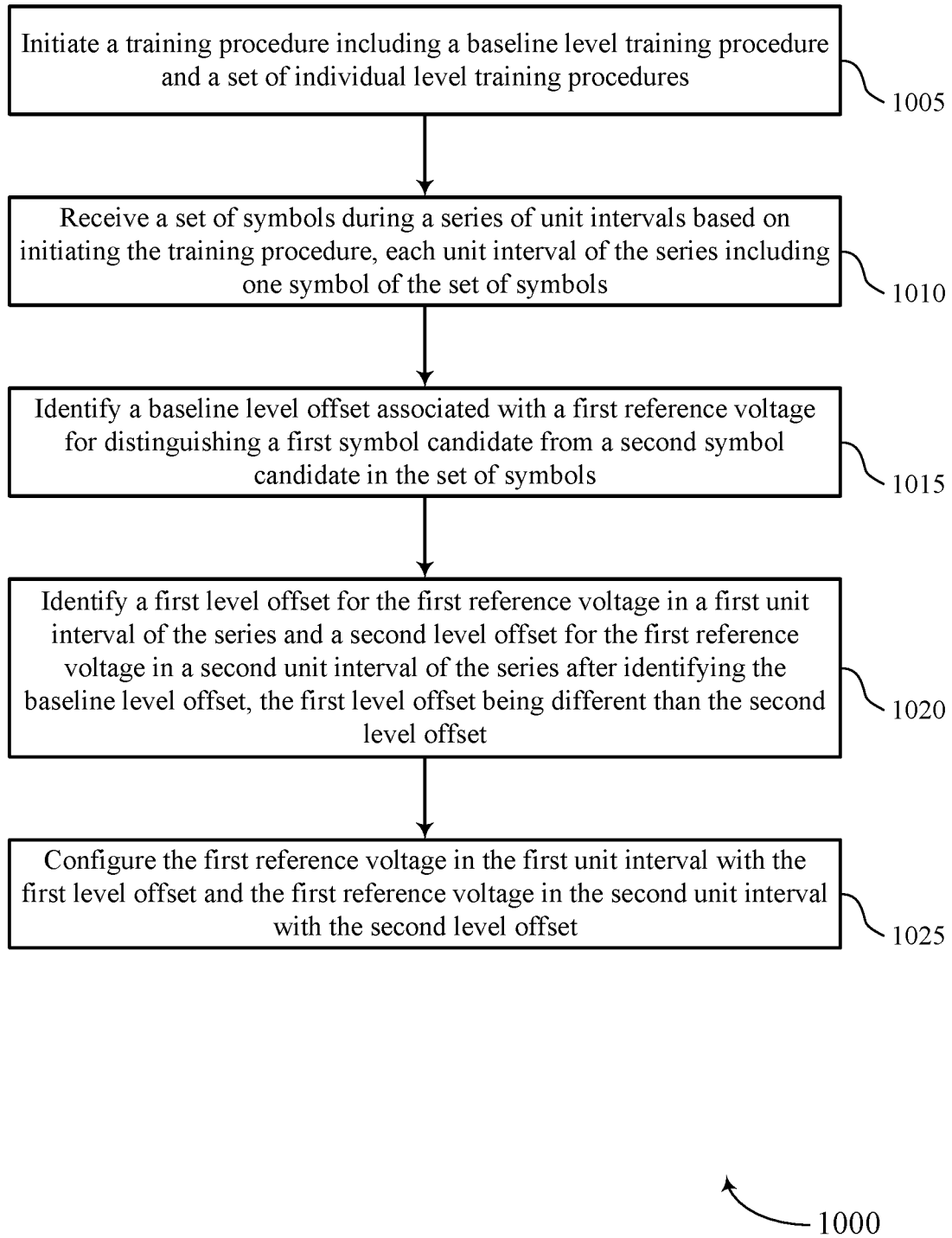

FIG. 10 shows a flowchart illustrating a method 1000 that supports training procedure for receivers in accordance with aspects of the present disclosure. The operations of method 1000 may be implemented by a controller (e.g., external memory controller 105, device memory controller 155, local memory controller 165, local memory controller 260, or a combination thereof) or its components as described herein. For example, the operations of method 1000 may be performed by a training manager as described with reference to FIG. 8. In some examples, a controller may execute a set of instructions to control the functional elements of the controller to perform the functions described below. Additionally or alternatively, a controller may perform aspects of the functions described below using special-purpose hardware.

At 1005, the controller may initiate a training procedure including a baseline level training procedure and a set of individual level training procedures. In some examples, aspects of the operations of 1005 may be performed by an initiation manager as described with reference to FIG. 8.

At 1010, the controller may receive a set of symbols during a series of unit intervals based on initiating the training procedure, each unit interval of the series including one symbol of the set of symbols. In some examples, aspects of the operations of 1010 may be performed by a receiver manager as described with reference to FIG. 8.

At 1015, the controller may identify a baseline level offset associated with a first reference voltage for distinguishing a first symbol candidate from a second symbol candidate in the set of symbols. In some examples, aspects of the operations of 1015 may be performed by a baseline voltage training manager as described with reference to FIG. 8.

At 1020, the controller may identify a first level offset for the first reference voltage in a first unit interval of the series and a second level offset for the first reference voltage in a second unit interval of the series after identifying the baseline level offset, the first level offset being different than the second level offset. In some examples, aspects of the operations of 1020 may be performed by an individual voltage training manager as described with reference to FIG. 8.

At 1025, the controller may configure the first reference voltage in the first unit interval with the first level offset and the first reference voltage in the second unit interval with the second level offset. In some examples, aspects of the operations of 1025 may be performed by a receiver manager as described with reference to FIG. 8.

Figure 11:
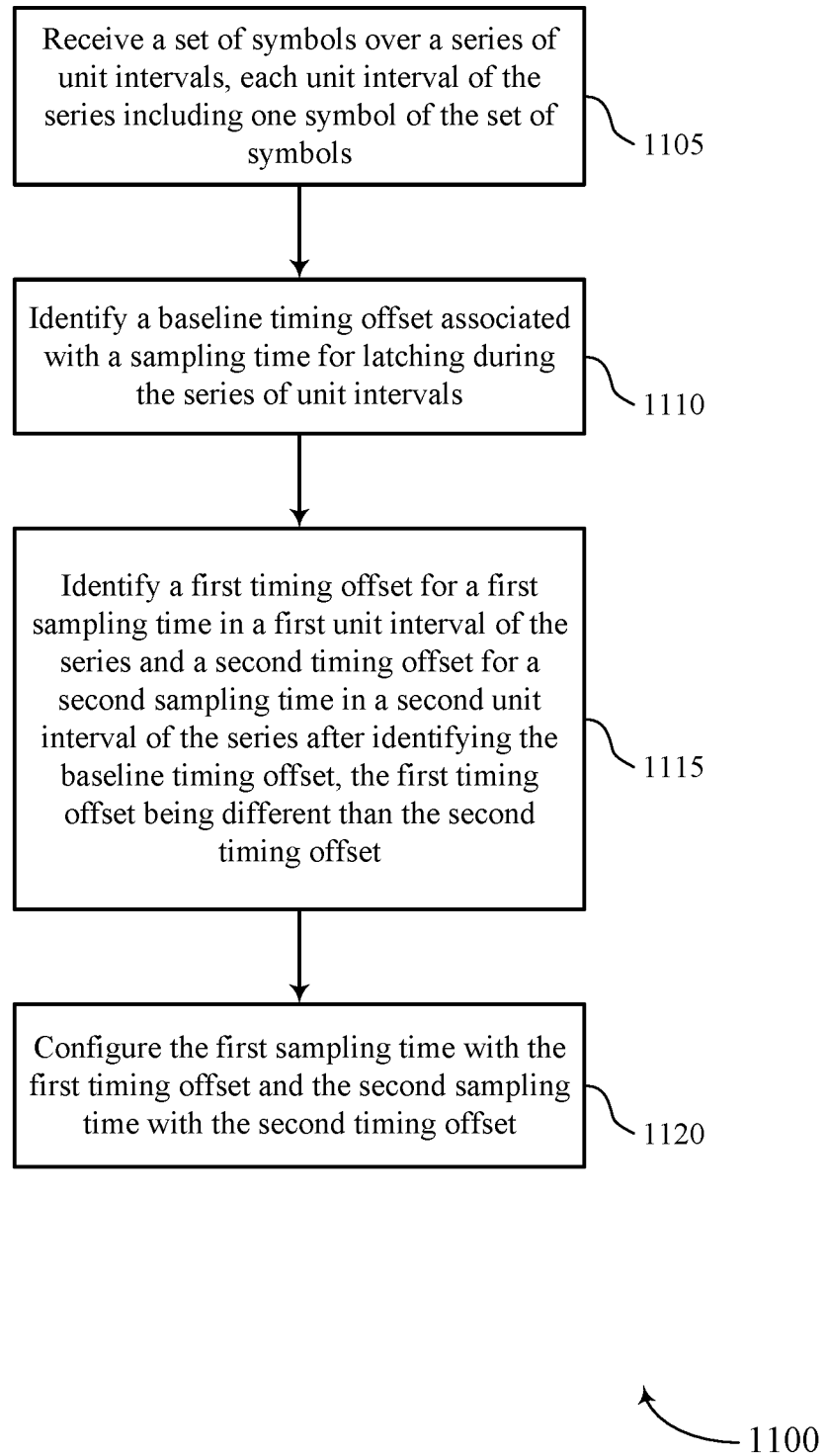

FIG. 11 shows a flowchart illustrating a method 800 that supports training procedure for receivers in accordance with aspects of the present disclosure. The operations of method 800 may be implemented by a controller (e.g., external memory controller 105, device memory controller 155, local memory controller 165, local memory controller 260, or a combination thereof) or its components as described herein. For example, the operations of method 800 may be performed by a training manager as described with reference to FIG. 8. In some examples, a controller may execute a set of instructions to control the functional elements of the controller to perform the functions described below. Additionally or alternatively, a controller may perform aspects of the functions described below using special-purpose hardware.

At 805, the controller may receive a set of symbols over a series of unit intervals, each unit interval of the series including one symbol of the set of symbols. In some examples, aspects of the operations of 805 may be performed by a receiver manager as described with reference to FIG. 8.

At 810, the controller may identify a baseline timing offset associated with a sampling time for latching during the series of unit intervals. In some examples, aspects of the operations of 810 may be performed by a baseline timing training manager as described with reference to FIG. 8.

At 815, the controller may identify a first timing offset for a first sampling time in a first unit interval of the series and a second timing offset for a second sampling time in a second unit interval of the series after identifying the baseline timing offset, the first timing offset being different than the second timing offset. In some examples, aspects of the operations of 815 may be performed by an individual timing training manager as described with reference to FIG. 8.

At 820, the controller may configure the first sampling time with the first timing offset and the second sampling time with the second timing offset. In some examples, aspects of the operations of 820 may be performed by a receiver manager as described with reference to FIG. 8.

An apparatus as described herein may perform a method or methods, such as the method 1100. The apparatus may include features, means, or instructions (e.g., a non-transitory computer-readable medium storing instructions executable by a processor) for receiving a set of symbols over a series of unit intervals, each unit interval of the series including one symbol of the set of symbols, identifying a baseline timing offset associated with a sampling time for latching during the series of unit intervals, identifying a first timing offset for a first sampling time in a first unit interval of the series and a second timing offset for a second sampling time in a second unit interval of the series after identifying the baseline timing offset, the first timing offset being different than the second timing offset, and configuring the first sampling time with the first timing offset and the second sampling time with the second timing offset.

Some examples of the method or apparatus may further include operations, features, means, or instructions for identifying a third timing offset in the first unit interval different than the first timing offset, where the first sampling time may be associated with a first reference voltage of the first unit interval and a third sampling time may be associated with a second reference voltage of the first unit interval.

Some examples of the method or apparatus may further include operations, features, means, or instructions for sampling, during the first unit interval, a first output of a first comparator associated with the first reference voltage at a first time based on the first sampling time and the first timing offset and sampling, during the first unit interval, a second output of a second comparator associated with the second reference voltage at a second time different than the first time, the second time being based on the first sampling time and the third timing offset.

Some examples of the method or apparatus may further include operations, features, means, or instructions for adjusting the first sampling time for the first unit interval and determining that an error occurred when demodulating a symbol of the set of symbols based on adjusting the first sampling time, where the first timing offset may be identified based on determining that the error occurs.

Some examples of the method or apparatus may further include operations, features, means, or instructions for transmitting a checksum that indicates that the error occurred, where the first timing offset may be identified based on transmitting the checksum.

Some examples of the method or apparatus may further include operations, features, means, or instructions for initiating a training procedure for determining the baseline timing offset and individual timing offsets, where receiving the set of symbols may be based on initiating the training procedure.

In some examples of the method or apparatus described herein, the training procedure may be initiated for each data pin of a channel.

Some examples of the method or apparatus may further include operations, features, means, or instructions for receiving, during the training procedure, a set of training bursts, each training burst including a set of predetermined symbols, where a single training burst includes the set of symbols.

In some examples of the method or apparatus described herein, the baseline timing offset includes an initial value and the first timing offset and the second timing offset may be identified based on the initial value.

Some examples of the method or apparatus may further include operations, features, means, or instructions for applying the baseline timing offset to the sampling time for the unit intervals of the series.

Figure 12:
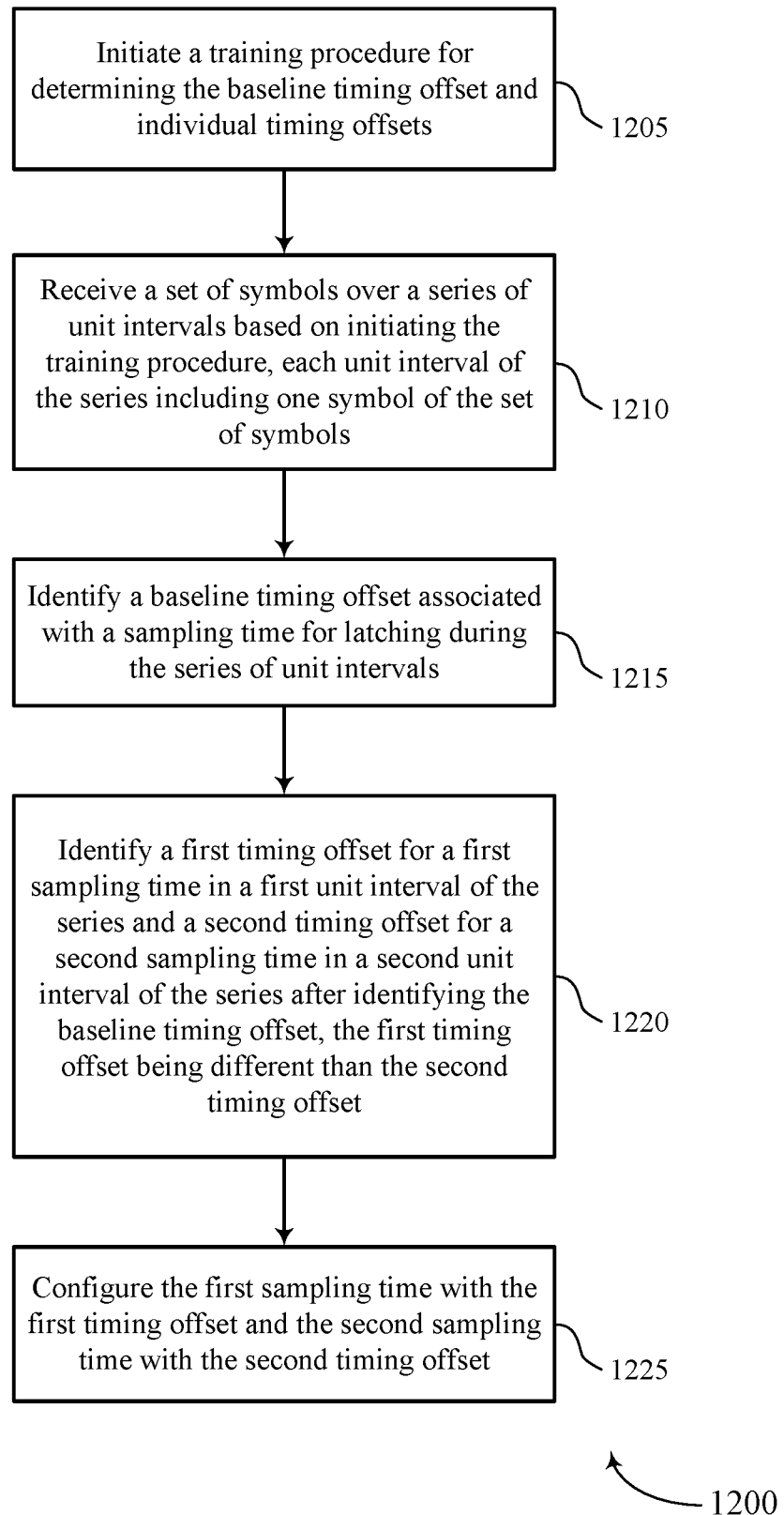

FIG. 12 shows a flowchart illustrating a method 1200 that supports training procedure for receivers in accordance with aspects of the present disclosure. The operations of method 1200 may be implemented by a controller (e.g., external memory controller 105, device memory controller 155, local memory controller 165, local memory controller 260, or a combination thereof) or its components as described herein. For example, the operations of method 1200 may be performed by a training manager as described with reference to FIG. 8. In some examples, a controller may execute a set of instructions to control the functional elements of the controller to perform the functions described below. Additionally or alternatively, a controller may perform aspects of the functions described below using special-purpose hardware.

At 1205, the controller may initiate a training procedure for determining the baseline timing offset and individual timing offsets. In some examples, aspects of the operations of 1205 may be performed by an initiation manager as described with reference to FIG. 8.

At 1210, the controller may receive a set of symbols over a series of unit intervals based on initiating the training procedure, each unit interval of the series including one symbol of the set of symbols. In some examples, aspects of the operations of 1210 may be performed by a receiver manager as described with reference to FIG. 8.

At 1215, the controller may identify a baseline timing offset associated with a sampling time for latching during the series of unit intervals. In some examples, aspects of the operations of 1215 may be performed by a baseline timing training manager as described with reference to FIG. 8.

At 1220, the controller may identify a first timing offset for a first sampling time in a first unit interval of the series and a second timing offset for a second sampling time in a second unit interval of the series after identifying the baseline timing offset, the first timing offset being different than the second timing offset. In some examples, aspects of the operations of 1220 may be performed by an individual timing training manager as described with reference to FIG. 8.

At 1225, the controller may configure the first sampling time with the first timing offset and the second sampling time with the second timing offset. In some examples, aspects of the operations of 1225 may be performed by a receiver manager as described with reference to FIG. 8.

It should be noted that the methods described above describe possible implementations, and that the operations and the steps may be rearranged or otherwise modified and that other implementations are possible. Furthermore, aspects from two or more of the methods may be combined.

In some examples, an apparatus or device may perform aspects of the functions described herein using general- or special-purpose hardware. The apparatus or device may include a pin configured to be coupled with a data bus, a receiver coupled with the pin and configured to receive a set of symbols over a series of unit intervals, the receiver including a comparator stage and a sampler stage. The comparator stage may include a first comparator coupled with the pin and a first reference voltage, the first comparator configured to distinguish a first symbol candidate from a second symbol candidate during a first unit interval of the series using the first reference voltage, and a second comparator coupled with the pin and a second reference voltage different than the first reference voltage, the second comparator configured to distinguish the first symbol candidate from the second symbol candidate during a second unit interval of the series using the second reference voltage. The sampler stage may include a first latch coupled with the first comparator and configured to sample an output of the first comparator during the first unit interval and a second latch coupled with the second comparator and configured to sample an output of the second comparator during the second unit interval.

In some examples, the comparator stage may include a third comparator coupled with the pin and a third reference voltage, the third comparator configured to distinguish the second symbol candidate from a third symbol candidate during the first unit interval using the third reference voltage. In some examples, the sampler stage may include a third latch coupled with the third comparator and configured to sample an output of the third comparator during the first unit interval, where the first latch is configured to sample the output of the first comparator at first sampling time during the first unit interval and the third latch is configured to sample the output of the third comparator at a second sampling time during the first unit interval that is different than the first sampling time.

In some examples, the receiver may include a comparator and a latch tuned to each reference voltage in each unit interval of the pin, the comparator and the latch being configured to demodulate the plurality of symbols received using the pin.

In some examples, the reference voltage coupled with each tuned comparator is adjustable independent of other reference voltages coupled with other tuned comparators of the receiver. In some examples, a sampling time for each tuned latch is adjustable independent of other sampling times of other tuned latches of the receiver.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

As used herein, the term "virtual ground" refers to a node of an electrical circuit that is held at a voltage of approximately zero volts (0V) but that is not directly coupled with ground. Accordingly, the voltage of a virtual ground may temporarily fluctuate and return to approximately 0V at steady state. A virtual ground may be implemented using various electronic circuit elements, such as a voltage divider consisting of operational amplifiers and resistors. Other implementations are also possible. "Virtual grounding" or "virtually grounded" means connected to approximately 0V.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

As used herein, the term "substantially" means that the modified characteristic (e.g., a verb or adjective modified by the term substantially) need not be absolute but is close enough to achieve the advantages of the characteristic.

As used herein, the term "electrode" may refer to an electrical conductor, and in some cases, may be employed as an electrical contact to a memory cell or other component of a memory array. An electrode may include a trace, wire, conductive line, conductive layer, or the like that provides a conductive path between elements or components of memory array.

As used herein, the term "shorting" refers to a relationship between components in which a conductive path is established between the components via the activation of a single intermediary component between the two components in question. For example, a first component shorted to a second component may exchange signals with the second component when a switch between the two components is closed. Thus, shorting may be a dynamic operation that enables the flow of charge between components (or lines) that are in electronic communication.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A device, comprising:
a pin configured to be coupled with a data bus;
a receiver coupled with the pin and configured to receive a plurality of symbols over a series of unit intervals, the receiver comprising a comparator stage and a sampler stage;
the comparator stage comprising:
a first comparator coupled with the pin and a first reference voltage, the first comparator configured to distinguish a first symbol candidate from a second symbol candidate during a first unit interval of the series using the first reference voltage; and
a second comparator coupled with the pin and a second reference voltage different than the first reference voltage, the second comparator configured to distinguish the first symbol candidate from the second symbol candidate during a second unit interval of the series using the second reference voltage; and
the sampler stage comprising:
a first latch coupled with the first comparator and configured to sample an output of the first comparator during the first unit interval; and
a second latch different than the first latch, the second latch coupled with the second comparator and configured to sample an output of the second comparator during the second unit interval.

2. The device of claim 1, wherein the comparator stage further comprises:
a third comparator coupled with the pin and a third reference voltage, the third comparator configured to distinguish the second symbol candidate from a third symbol candidate during the first unit interval using the third reference voltage; and
the sampler stage further comprises:
a third latch coupled with the third comparator and configured to sample an output of the third comparator during the first unit interval, wherein the first latch is configured to sample the output of the first comparator at first sampling time during the first unit interval and the third latch is configured to sample the output of the third comparator at a second sampling time during the first unit interval that is different than the first sampling time.

3. The device of claim 1, wherein the receiver further comprises:
a comparator and a latch tuned to each reference voltage in each unit interval of the pin, the comparator and the latch being configured to demodulate the plurality of symbols received using the pin.

4. The device of claim 3, wherein the reference voltage coupled with each tuned comparator is adjustable independent of other reference voltages coupled with other tuned comparators of the receiver.

5. The device of claim 3, wherein a sampling time for each tuned latch is adjustable independent of other sampling times of other tuned latches of the receiver.

6. A method, comprising:
receiving a plurality of symbols during a series of unit intervals, each unit interval of the series comprising one symbol of the plurality of symbols;
identifying a baseline level offset associated with a first reference voltage for distinguishing a first symbol candidate from a second symbol candidate in the plurality of symbols;
identifying a first level offset for the first reference voltage in a first unit interval of the series and a second level offset for the first reference voltage in a second unit interval of the series after identifying the baseline level offset, the first level offset being different than the second level offset; and
configuring the first reference voltage in the first unit interval with the first level offset and the first reference voltage in the second unit interval with the second level offset.

7. The method of claim 6, further comprising:
identifying a third level offset for a second reference voltage in the first unit interval of the series after identifying the baseline level offset, the third level offset being different than the first level offset and the second level offset; and
configuring the second reference voltage in the first unit interval with the third level offset.

8. The method of claim 6, further comprising:
sampling, during the first unit interval, a first output of a first comparator associated with the first reference voltage based at least in part on the first level offset and the first reference voltage.

9. The method of claim 6, further comprising:
adjusting the first reference voltage for the first unit interval; and
determining that an error occurred when demodulating a symbol of the plurality of symbols based at least in part on adjusting the first reference voltage, wherein the first level offset is identified based at least in part on determining that the error occurs.

10. The method of claim 9, further comprising:
transmitting an indication the error occurred, wherein the first level offset is identified based at least in part on transmitting the indication.

11. The method of claim 6, further comprising:
initiating a training procedure comprising a baseline level training procedure and a plurality of individual level training procedures, wherein receiving the plurality of symbols is based at least in part on initiating the training procedure.

12. The method of claim 11, wherein the training procedure is initiated for each pin of a channel.

13. The method of claim 6, further comprising:
receiving a plurality of training bursts to identify level offsets for individual reference voltages associated with individual unit intervals of the series, wherein a single training burst of the plurality comprise the plurality of symbols.

14. The method of claim 6, wherein the baseline level offset comprises an initial value and the first level offset and the second level offset are identified based at least in part on the initial value.

15. The method of claim 6, further comprising:
applying the baseline level offset to the first reference voltage for the unit intervals of the series.

16. A method, comprising:
receiving a plurality of symbols over a series of unit intervals, each unit interval of the series comprising one symbol of the plurality of symbols;
identifying a baseline timing offset associated with a sampling time for latching during the series of unit intervals;
identifying a first timing offset for a first sampling time in a first unit interval of the series and a second timing offset for a second sampling time in a second unit interval of the series after identifying the baseline timing offset, the first timing offset being different than the second timing offset; and configuring the first sampling time with the first timing offset and the second sampling time with the second timing offset.

17. The method of claim 16, further comprising:

identifying a third timing offset in the first unit interval different than the first timing offset, wherein the first sampling time is associated with a first reference voltage of the first unit interval and a third sampling time is associated with a second reference voltage of the first unit interval.

18. The method of claim 17, further comprising:

sampling, during the first unit interval, a first output of a first comparator associated with the first reference voltage at a first time based at least in part on the first sampling time and the first timing offset; and sampling, during the first unit interval, a second output of a second comparator associated with the second reference voltage at a second time different than the first time, the second time being based at least in part on the first sampling time and the third timing offset.

19. The method of claim 16, further comprising:

adjusting the first sampling time for the first unit interval; and determining that an error occurred when demodulating a symbol of the plurality of symbols based at least in part on adjusting the first sampling time, wherein the first timing offset is identified based at least in part on determining that the error occurs.

20. The method of claim 19, further comprising:

transmitting a checksum that indicates that the error occurred, wherein the first timing offset is identified based at least in part on transmitting the checksum.

21. The method of claim 16, further comprising:

initiating a training procedure for determining the baseline timing offset and individual timing offsets, wherein receiving the plurality of symbols is based at least in part on initiating the training procedure.

22. The method of claim 21, wherein the training procedure is initiated for each data pin of a channel.

23. The method of claim 21, further comprising:

receiving, during the training procedure, a plurality of training bursts, each training burst comprising a set of predetermined symbols, wherein a single training burst comprises the plurality of symbols.

24. The method of claim 16, wherein the baseline timing offset comprises an initial value and the first timing offset and the second timing offset are identified based at least in part on the initial value.

25. The method of claim 16, further comprising:

applying the baseline timing offset to the sampling time for the unit intervals of the series.

* * * * *